US011405162B2

(12) United States Patent
Papasakellariou

(10) Patent No.: US 11,405,162 B2
(45) Date of Patent: *Aug. 2, 2022

(54) TRANSMISSION OF UPLINK CONTROL INFORMATION IN CARRIER AGGREGATION WITH A LARGE NUMBER OF CELLS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

This patent is subject to a terminal disclaimer.

(21) Appl. No.: 15/929,821

(22) Filed: May 22, 2020

(65) Prior Publication Data

US 2020/0287694 A1    Sep. 10, 2020

Related U.S. Application Data

(63) Continuation of application No. 15/877,148, filed on Jan. 22, 2018, now Pat. No. 10,666,413, which is a
(Continued)

(51) Int. Cl.
*H04J 3/04*    (2006.01)
*H04W 72/04*    (2009.01)
(Continued)

(52) U.S. Cl.
CPC ............ *H04L 5/0057* (2013.01); *H04L 5/001* (2013.01); *H04L 5/0055* (2013.01); *H04L 27/36* (2013.01)

(58) Field of Classification Search
CPC ..... H04L 5/0057; H04L 1/1607; H04L 5/001; H04L 27/36; H04L 5/0055;
(Continued)

(56) References Cited

U.S. PATENT DOCUMENTS 8,588,259 B2 * 11/2013 Papasakellariou .... H04L 1/0026
370/535
2011/0249578 A1 * 10/2011 Nayeb Nazar ........ H04W 24/10
370/252
(Continued)

FOREIGN PATENT DOCUMENTS

| EP | 2583516 | 4/2013 |
|----|---------|--------|
| WO | 2010129606 A1 | 11/2010 |
| WO | 2011161616 A1 | 12/2011 |

OTHER PUBLICATIONS

Examination report in connection with Indian Application No. 201737019600 dated Jul. 15, 2020, 6 pages.

*Primary Examiner* — Edan Orgad
*Assistant Examiner* — Vanneilian Lalchinthang

(57) ABSTRACT

A user equipment (UE) transmits uplink control information (UCI) and a base station receives UCI when the UE is configured to have a number of cells configured for operation with carrier aggregation (CA). The base station configures the UE with a code rate and the UE determines a maximum UCI payload to transmit in a subframe that results in a transmission code rate that is no larger than the configured code rate. For transmission of aperiodic channel state information (A-CSI), a number of triggering states depends on the number of cells.

20 Claims, 15 Drawing Sheets

Related U.S. Application Data continuation of application No. 14/970,309, filed on Dec. 15, 2015, now Pat. No. 9,876,623.

(60) Provisional application No. 62/240,099, filed on Oct. 12, 2015, provisional application No. 62/204,713, filed on Aug. 13, 2015, provisional application No. 62/194,870, filed on Jul. 21, 2015, provisional application No. 62/190,728, filed on Jul. 10, 2015, provisional application No. 62/184,942, filed on Jun. 26, 2015, provisional application No. 62/095,296, filed on Dec. 22, 2014.

(51) Int. Cl.
 *H04L 5/00* (2006.01)
 *H04L 27/36* (2006.01)

(58) Field of Classification Search
 CPC ............. H04W 72/0413; H04W 16/28; H04B 7/0417; H04B 7/2612; Y02D 30/70
 USPC .......................................................... 370/329
 See application file for complete search history.

(56) References Cited

U.S. PATENT DOCUMENTS

| | | | |
|---|---|---|---|
| 2012/0140649 A1* | 6/2012 | Choudhury | H04L 1/0027 370/252 |
| 2013/0155974 A1* | 6/2013 | Papasakellariou | H04W 72/042 370/329 |
| 2014/0029532 A1* | 1/2014 | Han | H04W 16/18 370/329 |
| 2014/0044083 A1* | 2/2014 | Kim | H04L 5/0064 370/329 |
| 2014/0086174 A1* | 3/2014 | Nam | H04L 1/0026 370/329 |
| 2014/0169343 A1 | 6/2014 | Skov et al. | |
| 2014/0269600 A1* | 9/2014 | Lee | H04W 52/48 370/329 |
| 2016/0183244 A1* | 6/2016 | Papasakellariou | H04L 5/0057 370/329 |

\* cited by examiner

TRANSMISSION OF UPLINK CONTROL INFORMATION IN CARRIER AGGREGATION WITH A LARGE NUMBER OF CELLS

CROSS-REFERENCE TO RELATED APPLICATION AND CLAIM OF PRIORITY

This application is a continuation of U.S. Non-Provisional patent application Ser. No. 15/877,148 filed Jan. 22, 2018 and entitled "TRANSMISSION OF UPLINK CONTROL INFORMATION IN CARRIER AGGREGATION WITH A LARGE NUMBER OF CELLS," now U.S. Pat. No. 10,666, 413, which is a continuation of U.S. Non-Provisional patent application Ser. No. 14/970,309 filed Dec. 15, 2015 and entitled "TRANSMISSION OF UPLINK CONTROL INFORMATION IN CARRIER AGGREGATION WITH A LARGE NUMBER OF CELLS," now U.S. Pat. No. 9,876, 623, and claims priority to U.S. Provisional Patent Application No. 62/095,296 filed Dec. 22, 2014 and entitled "TRANSMISSION OF LARGE UPLINK CONTROL INFORMATION PAYLOADS," U.S. Provisional Patent Application No. 62/184,942 filed Jun. 26, 2015 and entitled "TRANSMISSION OF LARGE UPLINK CONTROL INFORMATION PAYLOADS," U.S. Provisional Patent Application No. 62/190,728 filed Jul. 10, 2015 entitled "MULTIPLEXING UPLINK CONTROL INFORMATION FOR MULTIPLE CELLS," U.S. Provisional Patent Application No. 62/194,870 filed Jul. 21, 2015 and entitled "MULTIPLEXING UPLINK CONTROL INFORMATION FOR MULTIPLE CELLS," U.S. Provisional Patent Application No. 62/204,713 filed Aug. 13, 2015 and entitled "MULTIPLEXING UPLINK CONTROL INFORMATION FOR MULTIPLE CELLS," and U.S. Provisional Patent Application No. 62/240,099 filed Oct. 12, 2015 and entitled "TRANSMISSION OF LARGE UPLINK CONTROL INFORMATION PAYLOADS." The content of the above-identified patent documents is incorporated herein by reference.

TECHNICAL FIELD

The present application relates generally to wireless communications and, more specifically, to transmission of uplink control information in carrier aggregation operation.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to support transmissions of uplink control information from a user equipment (UE) in carrier aggregation operation.

In a first embodiment, a UE includes a receiver, a processor, and a transmitter. The receiver is configured to receive a configuration for a set of cells and a configuration for a code rate r and for a first set of $M_{RB,1}^{PUCCH}$ resource blocks (RBs) for transmission of a physical uplink control channel (PUCCH) having a first format. Each RB includes $N_{sc}^{RB}$ resource elements (REs). The processor is configured to determine a set of $N_{CSI,total}$ CSI reports, for cells from the set of cells, for transmission in a subframe. The processor also is configured to compute, when $N_{CSI,total}$ is larger than one, a number of $O_{CSI}$ CSI information bits, where $$O_{CSI} = \sum_{n=1}^{N_{CSI,total}} O_{CSI,n},$$

for the set of $N_{CSI,total}$ CSI reports, a code rate $r_\alpha = (O_{CSI} + O_{CRC})/(SE_{mod} \cdot M_{RB,1}^{PUCCH} \cdot N_{sc}^{RB} \cdot N_{symb}^{PUCCH})$, and whether or not $r_\alpha$ is larger than r. $O_{CSI,n}$ is a number of CSI information bits for the n-th CSI report, $O_{CRC}$ is a number of cyclic redundancy check bits appended to the CSI information bits, $SE_{mod}$ is a number of bits per RE for a modulation scheme used for CSI transmission, and $N_{symb}^{PUCCH}$ is a number of subframe symbols available for CSI transmission in the subframe. The transmitter is configured to transmit either the $O_{CSI} + O_{CRC}$ bits when $r_\alpha$ is not larger than r or the $O_{CSI}^1 + O_{CRC}$ bits when $r_\alpha$ is larger than r. For the set of the first $N_{CSI,transmit}$ CSI reports from the set of $N_{CSI,total}$ CSI reports, the first $N_{CSI,transmit}$ CSI reports are determined according to an ascending order of predetermined priorities among the $N_{CSI,total}$ CSI reports, $$O_{CSI}^1 = \sum_{n=1}^{N_{CSI,transmit}} O_{CSI,n}, O_{CSI}^2 = \sum_{n=1}^{N_{CSI,transmit}+1} O_{CSI,n},$$

where $r_{tx,1} = (O_{HARQ-ACK} + O_{CSI}^1 + O_{CRC})/(SE_{mod} \cdot M_{RB,1}^{PUCCH} \cdot N_{sc}^{RB} \cdot N_{symb}^{PUCCH})$ is not larger than r, and $r_{tx,2} = (O_{HARQ-ACK} + O_{CSI}^2 + O_{CRC})/(SE_{mod} \cdot M_{RB,1}^{PUCCH} \cdot N_{sc}^{RB} \cdot N_{symb}^{PUCCH})$ is larger than r.

In a second embodiment, a UE includes a receiver, a processor, and a transmitter. The receiver is configured to receive a configuration for a set of cells and a configuration for a code rate r. The processor is configured to determine a set of $N_{CSI,total}$ CSI reports, for cells from the set of cells, and a set of $O_{HARQ-ACK}$ HARQ-ACK information bits for transmission in a subframe. The processor also is configured to compute, a number of $$O_{CSI} = \sum_{n=1}^{N_{CSI,total}} O_{CSI,n}$$

CSI information bits for the set of $N_{CSI,total}$ CSI reports, a code rate $r_{tx} = (O_{HARQ-ACK} + O_{CSI} + O_{CRC})/(SE_{mod} \cdot M_{RB,1}^{PUCCH} \cdot N_{sc}^{RB} \cdot N_{symb}^{PUCCH})$, and whether or not $r_{tx}$ is larger than r. $O_{CSI,n}$ is a number of CSI information bits for the n-th CSI report, $O_{CRC}$ is a number of cyclic redundancy check bits appended to the HARQ-ACK information bits and CSI information bits, $SE_{mod}$ is a number of bits per RE for a modulation scheme used for HARQ-ACK and CSI transmission, $M_{RB}^{PUCCH}$ is a number of resource blocks (RBs) for HARQ-ACK and CSI transmission, $N_{sc}^{RB}$ is a number of resource elements (REs) per RB, and $N_{symb}^{PUCCH}$ is a number of subframe symbols available for HARQ-ACK and CSI transmission in the subframe. The transmitter is configured to transmit either the $O_{HARQ-ACK}+O_{CSI}+O_{CRC}$ bits when $r_{tx}$ is not larger than r or the $O_{HARQ-ACK}+O_{CSI}^{1}+O_{CRC}$ bits when $r_{tx}$ is larger than r. For the set of the first $N_{CSI,transmit}$ CSI reports from the set of $N_{CSI,total}$ CSI reports, the first $N_{CSI,transmit}$ CSI reports are determined according to an ascending order of predetermined priorities among the $N_{CSI,total}$ CSI reports, $$O_{CSI}^{1} = \sum_{n=1}^{N_{CSI,transmit}} O_{CSI,n},\ O_{CSI}^{2} = \sum_{n=1}^{N_{CSI,transmit}+1} O_{CSI,n},$$

where $r_{tx,1}=(O_{HARQ-ACK}+O_{CSI}^{1}+O_{CRC})/(SE_{mod} \cdot M_{RB,1}^{PUCCH} \cdot N_{sc}^{RB} \cdot N_{symb}^{PUCCH})$ is not larger than r, and $r_{tx,2}=(O_{HARQ-ACK}+O_{CSI}^{2}+O_{CRC})/(SE_{mod} \cdot M_{RB,1}^{PUCCH} \cdot N_{sc}^{RB} \cdot N_{symb}^{PUCCH})$ is larger than r.

In a third embodiment, a base station includes a transmitter, a processor, and a receiver. The transmitter is configured to transmit a configuration for a set of cells and a configuration for a code rate r and for a first set of $M_{RB,1}^{PUCCH}$ resource blocks (RBs) for reception of a physical uplink control channel (PUCCH) having a first format. Each RB includes $N_{sc}^{RB}$ resource elements (REs). The processor is configured to determine a set of $N_{CSI,total}$ CSI reports, for cells from the set of cells, for reception in a subframe. The processor also is configured to compute, when $N_{CSI,total}$ is larger than one, a number of $$O_{CSI} = \sum_{n=1}^{N_{CSI,total}} O_{CSI,n}$$

CSI information bits for the set of $N_{CSI,total}$ CSI reports, a code rate $r_{tx}=(O_{CSI}+O_{CRC})/(SE_{mod} \cdot M_{RB}^{PUCCH} \cdot N_{sc}^{RB} \cdot N_{symb}^{PUCCH})$, and whether or not $r_{tx}$ is larger than r. $O_{CSI,n}$ is a number of CSI information bits for the n-th CSI report, $O_{CRC}$ is a number of cyclic redundancy check bits appended to the CSI information bits, $SE_{mod}$ is a number of bits per RE for a modulation scheme used for CSI reception, and $N_{symb}^{PUCCH}$ is a number of subframe symbols available for CSI reception in the subframe. The receiver is configured to receive either the $O_{CSI}+O_{CRC}$ bits when $r_{tx}$ is not larger than r or the $O_{CSI}^{1}+O_{CRC}$ bits when $r_{tx}$ is larger than r. For the set of the first $N_{CSI,transmit}$ CSI reports from the set of $N_{CSI,total}$ CSI reports, the first $N_{CSI,transmit}$ CSI reports are determined according to an ascending order of predetermined priorities among the $N_{CSI,total}$ CSI reports, $$O_{CSI}^{1} = \sum_{n=1}^{N_{CSI,transmit}} O_{CSI,n},$$

$$O_{CSI}^{2} = \sum_{n=1}^{N_{CSI,transmit}+1} O_{CSI,n},$$

where $r_{tx,1}=(O_{HARQ-ACK}+O_{CSI}^{1}+O_{CRC})/(SE_{mod} \cdot M_{RB,1}^{PUCCH} \cdot N_{sc}^{RB} \cdot N_{symb}^{PUCCH})$ is not larger than r, and $r_{tx,2}=(O_{HARQ-ACK}+O_{CSI}^{2}+O_{CRC})/(SE_{mod} \cdot M_{RB,1}^{PUCCH} \cdot N_{sc}^{RB} \cdot N_{symb}^{PUCCH})$ is larger than r.

In a fourth embodiment, a base station includes a transmitter, a processor, and a receiver. The transmitter is configured to transmit a configuration for a set of cells and a configuration for a code rate r. The processor is configured to determine a set of $N_{CSI,total}$ CSI reports, for cells from the set of cells, and a set of $O_{HARQ-ACK}$ HARQ-ACK information bits for reception in a subframe. The processor also is configured to compute, a number of $$O_{CSI} = \sum_{n=1}^{N_{CSI,total}} O_{CSI,n}$$

CSI information bits for the set of $N_{CSI,total}$ CSI reports, a code rate $r_{tx}=(O_{HARQ-ACK}+O_{CSI}+O_{CRC})/(SE_{mod} \cdot M_{RB}^{PUCCH} \cdot N_{sc}^{RB} \cdot N_{symb}^{PUCCH})$, and whether or not $r_{tx}$ is larger than r. $O_{CSI,n}$ is a number of CSI information bits for the n-th CSI report, $O_{CRC}$ is a number of cyclic redundancy check bits appended to the HARQ-ACK information bits and CSI information bits, $SE_{mod}$ is a number of bits per RE for a modulation scheme used for HARQ-ACK and CSI transmission, $M_{RB}^{PUCCH}$ is a number of resource blocks (RBs) for HARQ-ACK and CSI transmission, $N_{sc}^{RB}$ is a number of resource elements (REs) per RB, and $N_{symb}^{PUCCH}$ is a number of subframe symbols available for HARQ-ACK and CSI transmission in the subframe. The receiver is configured to receive either the $O_{HARQ-ACK}+O_{CSI}+O_{CRC}$ bits when $r_{tx}$ is not larger than r or the $O_{HARQ-ACK}+O_{CSI}+O_{CRC}$ bits when $r_{tx}$ is not larger than r or the $O_{HARQ-ACK}+O_{CSI}^{1}+O_{CRC}$ bits when $r_{tx}$ is larger than r. For the set of the first $N_{CSI,transmit}$ CSI reports from the set of $N_{CSI,total}$ CSI reports, the first $N_{CSI,transmit}$ CSI reports are determined according to an ascending order of predetermined priorities among the $N_{CSI,total}$ CSI reports, $$O_{CSI}^{1} = \sum_{n=1}^{N_{CSI,transmit}} O_{CSI,n},\ O_{CSI}^{2} = \sum_{n=1}^{N_{CSI,transmit}+1} O_{CSI,n},$$

where $r_{tx,1}=(O_{HARQ-ACK}+O_{CSI}^{1}+O_{CRC})/(SE_{mod} \cdot M_{RB,1}^{PUCCH} \cdot N_{sc}^{RB} \cdot N_{symb}^{PUCCH})$ is not larger than r, and $r_{tx,2}=(O_{HARQ-ACK}+O_{CSI}^{2}+O_{CRC})/(SE_{mod} \cdot M_{RB,1}^{PUCCH} \cdot N_{sc}^{RB} \cdot N_{symb}^{PUCCH})$ is larger than r.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v12.4.0, "E-UTRA, Physical channels and modulation" (REF 1); 3GPP TS 36.212 v12.4.0, "E-UTRA, Multiplexing and Channel coding" (REF 2); 3GPP TS 36.213 v12.4.0, "E-UTRA, Physical Layer Procedures" (REF 3); 3GPP TS 36.331 v12.4.0, "E-UTRA, Radio Resource Control (RRC) Protocol Specification" (REF 4); and U.S. Pat. No. 8,588,259, "Multiplexing Large Payloads of Control Information from User Equipments entitled "MULTIPLEXING LARGE PAYLOADS OF CONTROL INFORMATION FROM USER EQUIPMENTS" (REF 5).

One or more embodiments of the present disclosure relate to transmissions of uplink control information in carrier aggregation operation. A wireless communication network includes a downlink (DL) that conveys signals from transmission points, such as base stations or enhanced NodeBs (eNBs), to UEs. The wireless communication network also includes an uplink (UL) that conveys signals from UEs to reception points, such as eNBs.

Figure 1:
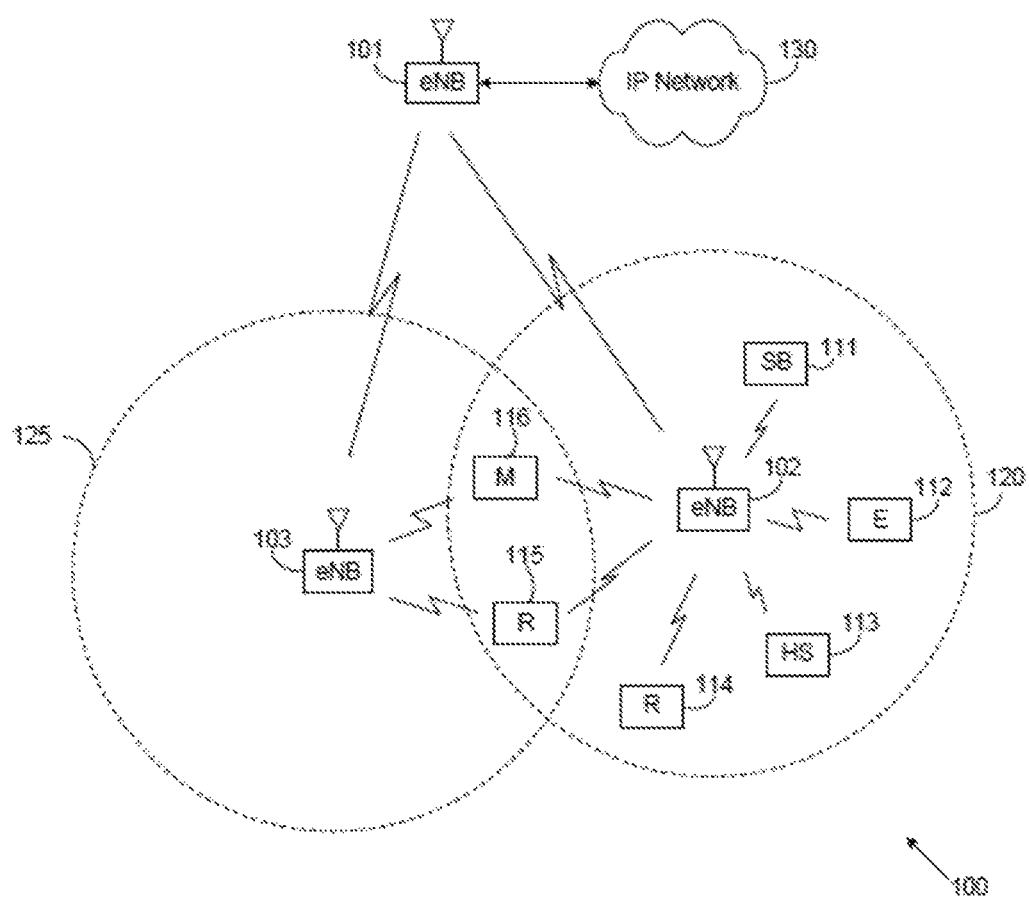
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 114, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 114. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, and can provide support for DL or UL transmissions in carrier aggregation operation.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly between them or with the network 130 and provide UEs with direct wireless broadband access to the network 130. Further, the eNB 101, 102, and/or 103 could provide access to other or additional external networks, such as external telephone networks or other types of data networks.

Figure 2:
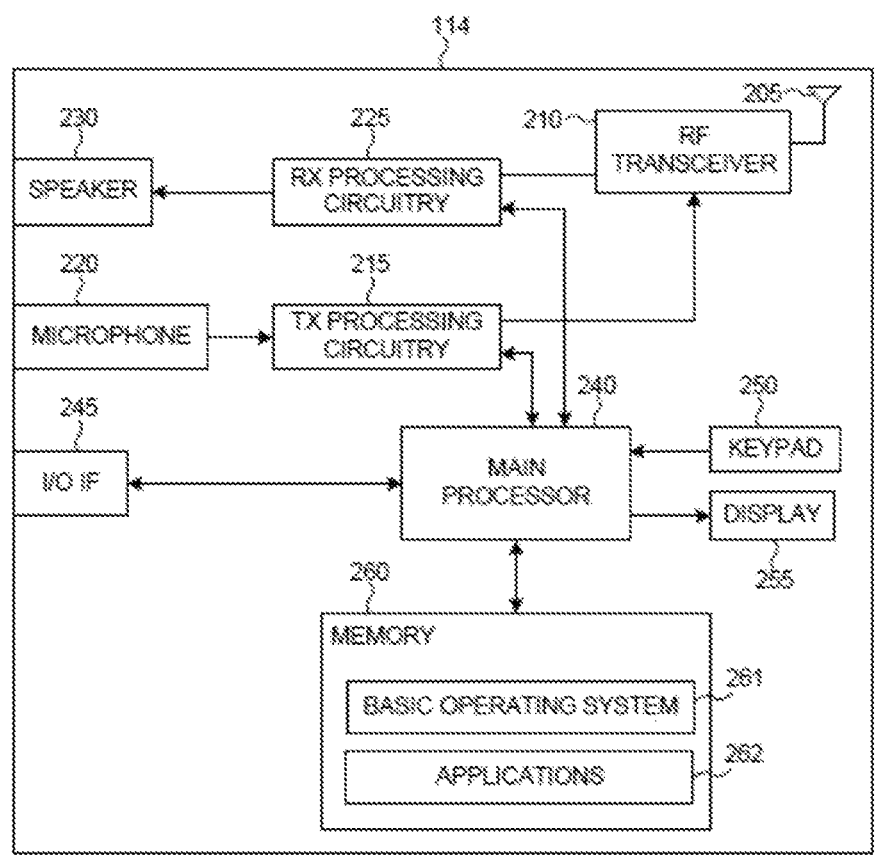
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touch-screen.

The memory 260 is coupled to the main processor 240. Part of the memory 260 could include a control or data signaling memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support respective DL or UL transmissions in carrier aggregation operation.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
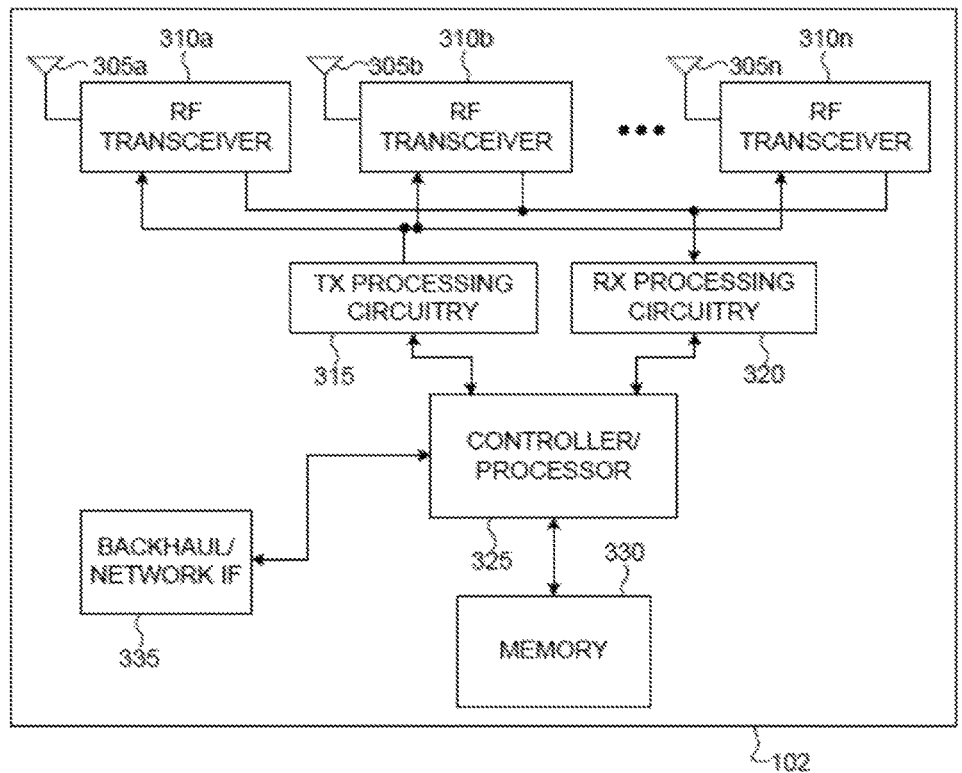
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs, such as eNB 103, over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support respective DL or UL transmissions in carrier aggregation operation.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals can include data signals conveying information content, control signals conveying DL control information (DCI), and reference signals (RS) that are also known as pilot signals. An eNB, such as eNB 102, can transmit one or more of multiple types of RS, including UE-common RS (CRS), channel state information RS (CSI-RS), and demodulation RS (DMRS). A CRS can be transmitted over a DL system bandwidth (BW) and can be used by a UE, such as UE 114, to demodulate data or control signals or to perform measurements. To reduce CRS overhead, eNB 102 can transmit a CSI-RS with a smaller density in the time domain than a CRS (see also REF 1 and REF 3). UE 114 can use either a CRS or a CSI-RS to perform measurements and a selection can be based on a transmission mode (TM) UE 114 is configured by eNB 102 for physical DL shared channel (PDSCH) reception (see also REF 3). Finally, DMRS is transmitted only in the BW of a respective PDSCH or physical DL control channel (PDCCH) and UE 114 can use the DMRS to demodulate information in a PDSCH or PDCCH.

In some wireless networks, UL signals can include data signals conveying information content, control signals conveying UL control information (UCI), and RS. A UE, such as UE 114, can transmit data information or UCI through a respective physical UL shared channel (PUSCH) or a physical UL control channel (PUCCH) to an eNB, such as eNB 102. If UE 114 simultaneously transmits data information and UCI, UE 114 can multiplex both in a PUSCH. UCI can include hybrid automatic repeat request acknowledgement (HARQ-ACK) information indicating correct or incorrect detection of data transport blocks (TBs) in respective PDSCHs, scheduling request (SR) information indicating to eNB 102 whether UE 114 has data in its buffer, and channel state information (CSI) enabling eNB 102 to select appropriate parameters for PDSCH or PDCCH transmissions to UE 114. HARQ-ACK information can include a positive acknowledgement (ACK) in response to a correct PDCCH or data TB detection, a negative acknowledgement (NACK) in response to incorrect data TB detection, and an absence of PDCCH detection (DTX) that can be implicit or explicit. A DTX could be implicit when UE 114 does not transmit a HARQ-ACK signal. It is also possible to represent NACK and DTX with a same NACK/DTX state in the HARQ-ACK information (see also REF 3).

CSI can include a channel quality indicator (CQI) informing eNB 102 of a transport block size (TBS) having a modulation and coding scheme (MCS) that can be received by UE 114 with a predefined target block error rate (BLER), a precoding matrix indicator (PMI) informing eNB 102 how to combine signals from multiple transmitted antennas in accordance with a multiple input multiple output (MIMO) transmission principle, and a rank indicator (RI) indicating a transmission rank for a PDSCH (see also REF 3). For example, UE 114 can determine a CQI from a signal-to-interference and noise ratio (SINR) measurement while also considering a configured PDSCH TM and the UE 114 receiver characteristics. CSI transmission can be periodic (P-CSI) in a PUCCH using for example a PUCCH Format 2 to convey a P-CSI report for a single cell (see also REF 1) or aperiodic (A-CSI) to convey A-CSI for one or more cells in a PUSCH.

UL RS can include DMRS and sounding RS (SRS). DMRS can be transmitted only in a BW of a respective PUSCH or PUCCH and eNB 102 can use a DMRS to demodulate information in a PUSCH or PUCCH. SRS can be transmitted by UE 114 in order to provide eNB 102 with a UL CSI (see also REF 2 and REF 3).

The eNB 102 can schedule PDSCH transmission to UE 114 or PUSCH transmission from UE 114 through respective DCI formats conveyed by respective PDCCHs. DCI formats can also provide other functionalities (see also REF 2).

A transmission time interval (TTI) for DL signaling or for UL signaling is one subframe (SF). For example, an SF duration can be one millisecond (msec). A unit of 10 SFs, indexed from 0 to 9, is referred to as a frame. In a time division duplex (TDD) system, a communication direction in some SFs is in the DL, and a communication direction in some other SFs is in the UL.

Figure 4:
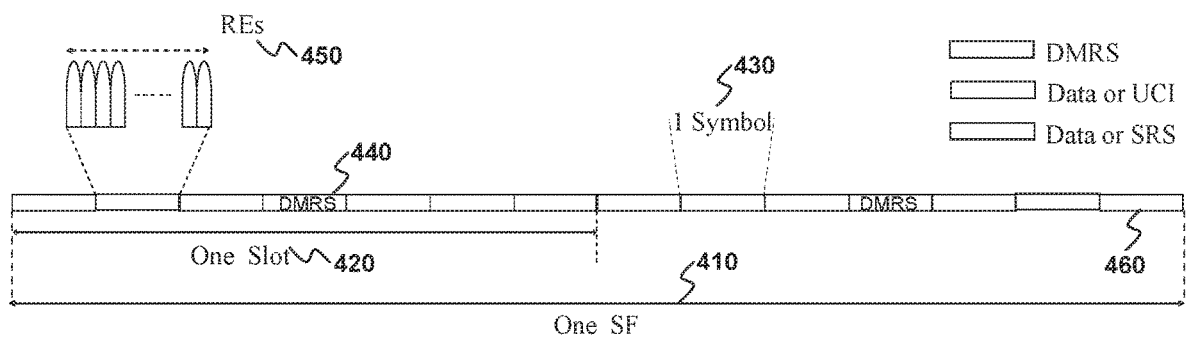
FIG. 4 illustrates an example UL SF structure for PUSCH transmission or PUCCH transmission according to this disclosure.

FIG. 4 illustrates an example UL SF structure for PUSCH transmission or PUCCH transmission according to this disclosure. The embodiment of the UL SF structure shown in FIG. 4 is for illustration only. Other embodiments could be used without departing from the scope of the present disclosure.

UL signaling can use Discrete Fourier Transform Spread OFDM (DFT-S-OFDM). An UL SF 410 includes two slots. Each slot 420 includes $N_{symb}^{UL}$ symbols 430 where UE 114 transmits data information, UCI, or RS including one symbol per slot where UE 114 transmits DMRS 440. A transmission BW includes frequency resource units that are referred to as resource blocks (RBs). Each RB includes $N_{sc}^{RB}$ (virtual) sub-carriers that are referred to as resource elements (REs). A transmission unit of 1 RB over 1 SF is referred to as a physical RB (PRB). UE 114 is assigned $M_{RB}^{PUXCH}$ RBs 440 for a total of $M_{RB}^{PUXCH} = M_{sc}^{PUXCH} \cdot N_{sc}^{RB}$ REs 450 for a PUSCH transmission BW ("X"="S") or for a PUCCH transmission BW ("X"="C"). A last SF symbol can be used to multiplex SRS transmissions 460 from one or more UEs. A number of UL SF symbols available for data/UCI/DMRS transmission is $N_{symb}^{PUCCH} = 2 \cdot (N_{symb}^{UL} - 1) - N_{SRS}$. $N_{SRS} = 1$ when a last UL symbol supports SRS transmissions from UEs that overlap at least partially in BW with a PUSCH transmission BW; otherwise, $N_{SRS} = 0$. Therefore, a number of total REs for a PUXCH transmission is $M_{sc}^{PUXCH} \cdot N_{symb}^{PUXCH}$.

A PUCCH format having a structure as in FIG. 4 (see also REF 5) is referred to as PUCCH Format 4. For transmission of a UCI (HARQ-ACK, or SR, or P-CSI) payload of $O_{UCI}$ information bits in a PUCCH over $M_{RB}^{PUCCH}$ RBs and over $N_{symb}^{PUXCH}$ symbols of a SF, a transmission code rate is $r_{tx} = O_{UCI}/(SE_{mod} \cdot M_{RB}^{PUCCH} \cdot N_{sc}^{RB} \cdot N_{symb}^{PUCCH})$ where $SE_{mod}$ is a number of bits per RE for a respective modulation scheme. For example, $SE_{mod} = 2$ for QPSK and $SE_{mod} = 4$ and QAM16. When a number of $O_{CRC}$ cyclic redundancy check (CRC) bits, such as 8 CRC bits or 16 CRC bits, is appended to the $O_{UCI}$ information bits, a transmission code rate is $r_{tx} = (O_{UCI} + O_{CRC})/SE_{mod} \cdot M_{RB}^{PUCCH} \cdot N_{sc}^{RB} \cdot N_{symb}^{PUCCH})$.

UE 114 is configured by higher layer signaling whether or not to multiplex HARQ-ACK and P-CSI in a PUCCH in a same subframe (see also REF 3 and REF 4). When UE 114 is configured to not multiplex HARQ-ACK and P-CSI in a PUCCH in a same subframe, UE 114 transmits only HARQ-ACK.

Figure 5:
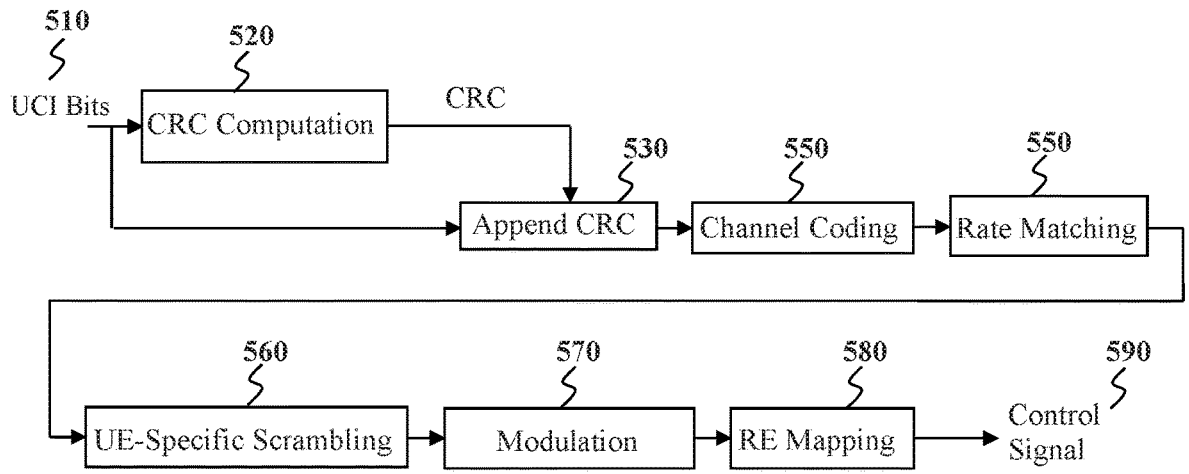
FIG. 5 illustrates an example encoding process for UCI according to this disclosure.

FIG. 5 illustrates an example encoding process for UCI according to this disclosure. The embodiment of the encoding process shown in FIG. 5 is for illustration only. Other embodiments could be used without departing from the scope of the present disclosure.

UE 114 computes a CRC of UCI information bits 510 using a CRC computing unit or circuit 520, appends the CRC bits to UCI information bits 530, encodes the output using for example a tail biting convolutional code (TBCC) 540, followed by rate matching to allocated resources 550, scrambling 560, modulation 570 for example using QPSK, RE mapping 580, and finally transmission of a control signal 590. In the present example, both a CRC includes 8 bits.

Figure 6:
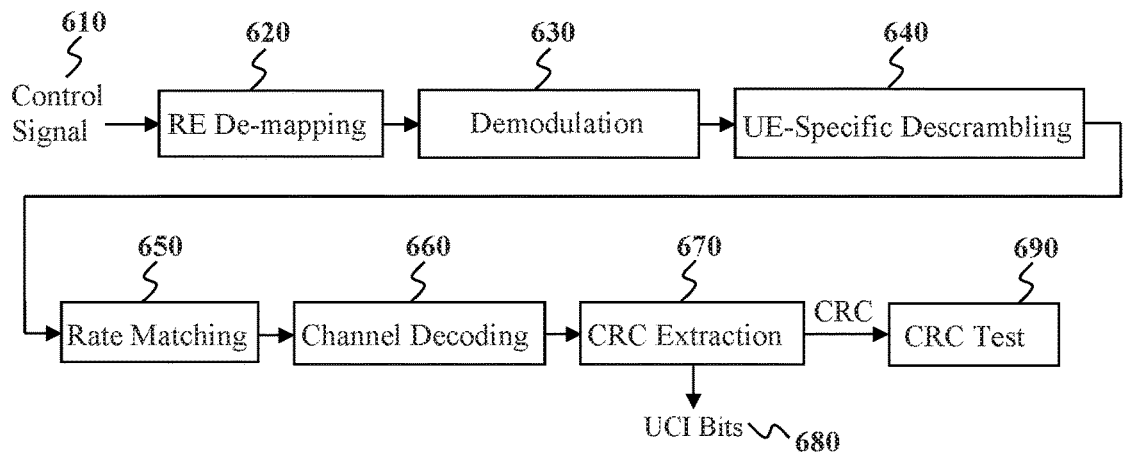
FIG. 6 illustrates an example decoding process for UCI according to this disclosure.

FIG. 6 illustrates an example decoding process for UCI according to this disclosure. The embodiment of the decoding process shown in FIG. 6 is for illustration only. Other embodiments could be used without departing from the scope of the present disclosure.

The eNB 102 receives a control signal 610 and performs RE demapping 620, demodulation for the corresponding modulation scheme 630, descrambling 640, rate matching 650, decoding using for example a TBCC decoder 660, extraction 670 of UCI bits 680 and CRC bits, and finally a CRC check 690. When the CRC check passes (CRC checksum is zero), eNB 102 determines that the UCI is valid.

Figure 7:
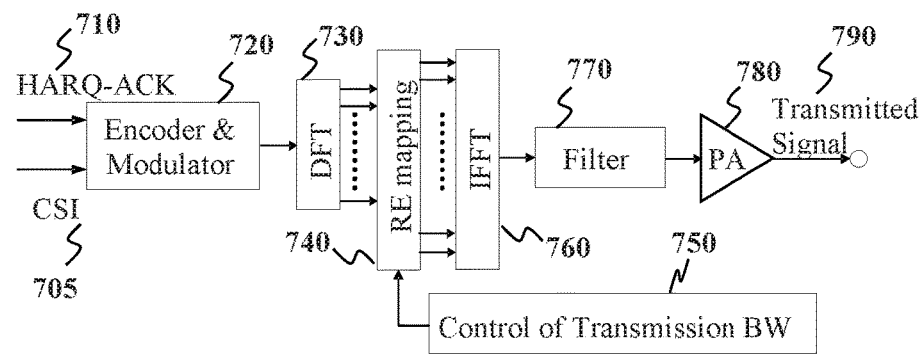
FIG. 7 illustrates an example UE transmitter for a PUCCH Format 4 according to this disclosure.

FIG. 7 illustrates an example UE transmitter for a PUCCH Format 4 according to this disclosure. The embodiment of the transmitter shown in FIG. 7 is for illustration only. Other embodiments could be used without departing from the scope of the present disclosure.

UCI bits from UE 114, such as $O_{P\text{-}CSI}$ P-CSI information bits 705, if any, and $O_{HARQ\text{-}ACK}$ HARQ-ACK information bits 710, if any, but also a SR bit in a SF configured to UE 114 for SR transmission (not shown), are encoded and modulated 720 for example as described in FIG. 5. A discrete Fourier transform (DFT) is obtained by DFT circuit 730, REs 740 corresponding to a PUCCH transmission BW are selected by selector 750, an inverse fast Fourier transform (IFFT) is performed by IFFT circuit 760, an output is filtered and by filter 770 and applied a certain power by power amplifier (PA) 780 and a signal is then transmitted 790. Due to the DFT mapping, the REs can be viewed as virtual REs but are referred to as REs for simplicity.

Figure 8:
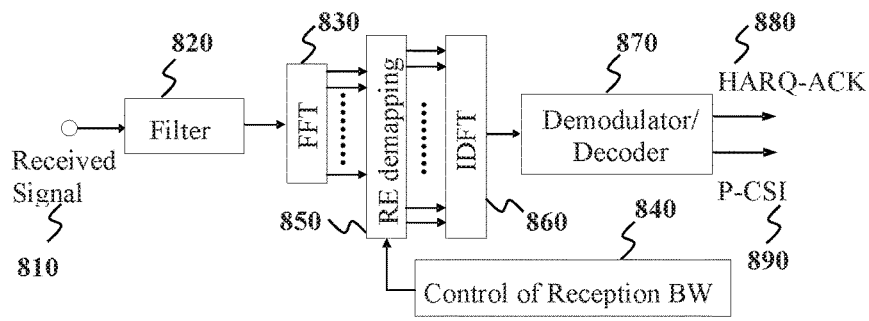
FIG. 8 illustrates an example eNB receiver for a PUCCH Format 4 according to this disclosure.

FIG. 8 illustrates an example eNB receiver for a PUCCH Format 4 according to this disclosure. The embodiment of the receiver shown in FIG. 8 is for illustration only. Other embodiments could be used without departing from the scope of the present disclosure.

A received signal 810 is filtered by filter 820, a fast Fourier transform (FFT) is applied by FFT circuit 830, a selector circuit 840 selects REs 850 used by a transmitter, an inverse DFT (IDFT) circuit applies an IDFT 860, a demodulator and a decoder 870 demodulate and decode the IDFT output using a channel estimate provided by a channel estimator (not shown) and output $O_{HARQ\text{-}ACK}$ HARQ-ACK information bits 880, if any, and $O_{P\text{-}CSI}$ P-CSI information bits 890, if any.

For a P-CSI report for a single cell, eNB 102 configures UE 114, among other parameters such as a CQI feedback type, a PUCCH Format 2 resource, a SF offset and a periodicity for the P-CSI report transmission (see also REF3 and REF 4).

A transmission power for a PUCCH format by UE 114 is determined according to a power control formula (see also REF 3) that enables eNB 102 to operate UCI transmissions from UE 114 in the PUCCH format with a desired target BLER. A transmission power for a PUCCH format in a SF cannot exceed a maximum transmission power that UE 114 is configured by eNB 102 in the SF (see also REF 3).

When UE 114 transmits HARQ-ACK in a PUSCH that conveys one data TB, UE 114 determines a number of coded modulation symbols per layer Q' for HARQ-ACK as in Equation 1 (see also REF 2)

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right) \quad (1)$$

where
O is the number of HARQ-ACK bits, and
$M_{sc}^{PUSCH}$ is the scheduled PUSCH transmission BW, in number of REs, in the current SF for the data TB,
$N_{symb}^{PUSCH\text{-}initial}$ is the number of SF symbols for initial PUSCH transmission for the same data TB, and
$M_{sc}^{PUSCH\text{-}initial}$, C, and $K_r$ are obtained from the initial PDCCH or EPDCCH for the same data TB. If there is no initial PDCCH or EPDCCH for the same data TB, $M_{sc}^{PUSCH\text{-}initial}$, C, and $K_r$ are determined from the most recent semi-persistent scheduling (SPS) assignment when the initial PUSCH for the same data TB is SPS or from the random access response grant for the same data TB when the PUSCH is initiated by the random access response grant.

When UE 114 transmits HARQ-ACK in a PUSCH that conveys two data TBs, UE 114 determines a number of coded modulation symbols per layer Q' as described in REF 2 and additional description in this disclosure is omitted for brevity.

When UE 114 transmits CQI/PMI bits in a PUSCH, UE 114 determines a number of coded modulation symbols per layer Q' as in Equation 2

$$Q' = \min\left(\left\lceil \frac{(O+L) \cdot M_{sc}^{PUSCH\text{-}initial(x)} \cdot N_{symb}^{PUSCH\text{-}initial} \cdot \beta_{offset}^{PUSCH}}{\sum_{r=0}^{C^{(x)}-1} K_r^{(x)}} \right\rceil,\right. \quad (2)$$

$$\left. M_{sc}^{PUSCH} \cdot M_{symb}^{PUSCH} - \frac{Q_{RI}^{(x)}}{Q_m^{(x)}}\right)$$

where
O is the number of CQI/PMI bits, and
L is the number of CRC bits given by $$L = \begin{cases} 0 & O \leq 11 \\ 8 & \text{otherwise} \end{cases},$$

and
$Q_{CQI} = Q_m^{(x)} \cdot Q'$ and $\beta_{offset}^{PUSCH} = \beta_{offset}^{CQI}$, where $\beta_{offset}^{CQI}$ are determined according to REF 3 depending on the number of transmission codewords for the corresponding PUSCH, and on the UL power control SF set for the corresponding PUSCH when two UL power control SF sets are configured by higher layers for the cell.

If RI is not transmitted then $Q_{RI}^{(x)}=0$.

Remaining notation is similar to the one described for HARQ-ACK and is not described for brevity (see REF 2).

Control and data multiplexing is performed such that HARQ-ACK information is present on both slots and is mapped to resources around the demodulation RS (see also REF 2). The multiplexing ensures that control and data information are mapped to different modulation symbols. The inputs to the data and control multiplexing are the coded bits of the control information denoted by $q_0, q_1, q_2, q_3, \ldots q_{N_L \cdot Q_{CQI}-1}$ and the coded bits of the UL-SCH denoted by $f_0, f_1, f_2, f_3, \ldots f_{G-1}$. The output of the data and control multiplexing operation is denoted by $g_0, g_1, g_2, g_3, \ldots g_{H'-1}$, where $H=(G+N_L \cdot Q_{CQI})$ and $H'=H/(N_L \cdot Q_{CQI})$, and where $g_i$, $i=0, \ldots, H'-1$ are column vectors of length $(Q_m \cdot N_L)$. H is the total number of coded bits allocated for data and CQI/PMI information across the $N_L$ transmission layers of the data TB. Control and data multiplexing when more than one data TB is transmitted in a SF is described in REF 2 and additional description in this disclosure is omitted for brevity.

A PUSCH transmission can convey only A-CSI, and can also include HARQ-ACK or RI, without including any data transmission. When a UE detects a DCI format with a CSI request triggering an A-CSI report for more than one serving cells, the UE can determine to not include data in a PUSCH transmission when the DCI format indicates a PUSCH transmission in less than 20 PRBs, $N_{PRB} \leq 20$, and an MCS index of 29, $I_{MCS}=29$, indicating a last data TB retransmission (see also REF 3).

A CSI request field in a DCI format triggering A-CSI transmission in a PUSCH includes a predefined number of bits, such as 1 bit or 2 bits (see also REF 2 and REF 3). A mapping of the 2 bits can be as in TABLE 1 when UE 114 is configured with a PDSCH TM from 1 to 9 associated with a single CSI process or as in TABLE 2 when a UE is configured with a PDSCH TM 10 associated with multiple CSI processes (see also REF 3).

TABLE 1

Mapping of CSI request field to CSI reports for PDSCH TM from 1 to 9

| Value of CSI request field | Description |
| --- | --- |
| 00 | No aperiodic CSI report is triggered |
| 01 | Aperiodic CSI report is triggered for serving cell c |
| 10 | Aperiodic CSI report is triggered for a 1st set of serving cells configured by higher layers |
| 11 | Aperiodic CSI report is triggered for a 2nd set of serving cells configured by higher layers |

TABLE 2

Mapping of CSI request field to CSI reports for PDSCH TM 10

| Value of CSI request field | Description |
| --- | --- |
| 00 | No aperiodic CSI report is triggered |
| 01 | Aperiodic CSI report is triggered for a set of CSI process(es) configured by higher layers for serving cell c |

TABLE 2-continued

Mapping of CSI request field to CSI reports for PDSCH TM 10

| Value of CSI request field | Description |
| --- | --- |
| 10 | Aperiodic CSI report is triggered for a 1st set of CSI process(es) configured by higher layers |
| 11 | Aperiodic CSI report is triggered for a 2nd set of CSI process(es) configured by higher layers |

Several P-CSI report types are supported on PUCCH (see also REF 3) including Type 1 report that supports CQI feedback for sub-bands selected by UE 114, Type 1a report that supports subband CQI and second PMI feedback, Type 2, Type 2b, and Type 2c report that supports wideband CQI and PMI feedback, Type 2a report that supports wideband PMI feedback, Type 3 report that supports RI feedback, Type 4 report that supports wideband CQI, Type 5 report that supports RI and wideband PMI feedback, and Type 6 report that supports RI and PTI feedback. UE 114 and eNB 102 determine the number of P-CSI information bits for a P-CSI report from the respective P-CSI report type (see also REF 3).

When collision of a CSI report with PUCCH reporting type 3, 5, or 6 of one cell with a CSI report with PUCCH reporting type 1, 1a, 2, 2a, 2b, 2c, or 4 of the same cell, the latter CSI report with PUCCH reporting type (1, 1a, 2, 2a, 2b, 2c, or 4) has lower priority and is dropped (see also REF 3). When UE 114 is configured with TM 10, when collision between CSI reports of a same cell with PUCCH reporting type of same priority and CSI reports corresponding to different CSI processes, the CSI reports corresponding to all CSI processes except the CSI process identity with the lowest index are dropped (see also REF 3). When UE 114 is configured with TM 1-9 and configured with CSI SF sets $C_{CSI,0}$ and $C_{CSI,1}$ for a cell, when collision between CSI reports of the cell with PUCCH reporting type of same priority, the CSI report corresponding to CSI SF set $C_{CSI,1}$ is dropped. When UE 114 is configured with TM 10 and configured with CSI SF sets $C_{CSI,0}$ and $C_{CSI,1}$ for a cell, when collision between CSI reports of the cell with PUCCH reporting type of same priority and CSI reports corresponding to CSI processes with same identity index, the CSI report corresponding to CSI SF set $C_{CSI,1}$ is dropped. Therefore, different priorities exist for UE 114 to transmit CSI reports when collisions and the order of priorities, from highest to lowest, are for CSI report type 3/5/6/2a (highest), CSI report type 2/2b/2c/4, CSI report type 1/1a, CSI process identity index when UE 114 is configured with TM10, cell index, and CSI SF set index.

Figure 9:
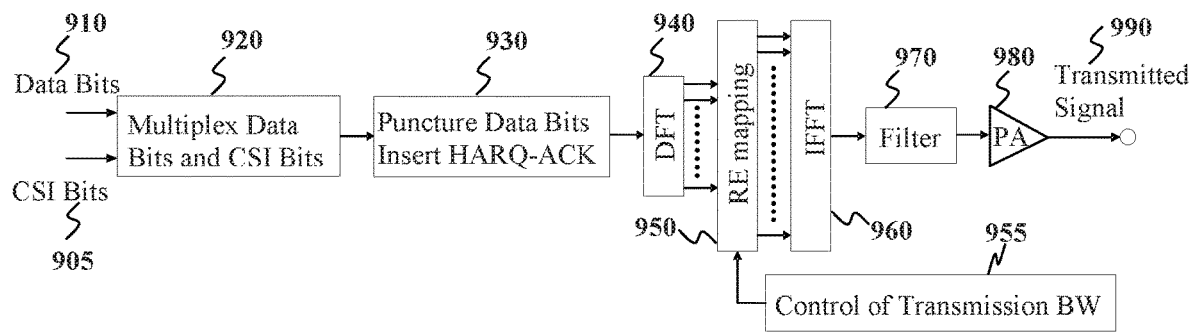
FIG. 9 illustrates an example UE transmitter for data information and UCI in a PUSCH according to this disclosure.

FIG. 9 illustrates an example UE transmitter for data information and UCI in a PUSCH according to this disclosure. The embodiment of the transmitter shown in FIG. 9 is for illustration only. Other embodiments could be used without departing from the scope of the present disclosure.

Encoded and modulated CSI symbols 905, if any, and encoded and modulated data symbols 910, if any, are multiplexed by multiplexer 920. Encoded and modulated HARQ-ACK symbols, if any, are then inserted by multiplexer 930 by puncturing data symbols and/or CSI symbols. A transmission of coded RI symbols, if any, is similar to one for coded HARQ-ACK symbols (not shown). A DFT is obtained by DFT filter 940, REs 950 corresponding to a PUSCH transmission BW are selected by selector 955, an IFFT is performed by IFFT filter 960, an output is filtered and by filter 970 and applied a certain power by PA 980 and a signal is then transmitted 990. If any of data, CSI, HARQ-ACK, or RI is not transmitted, a block in FIG. 9 corresponding to a respective transmitter processing function is omitted.

Figure 10:
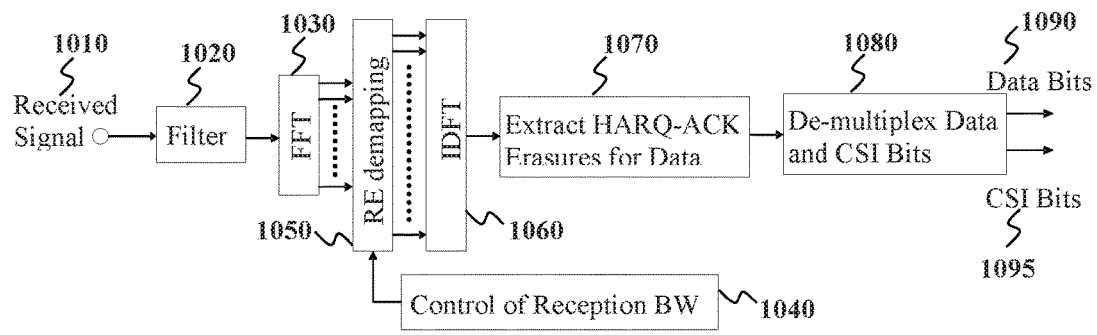
FIG. 10 illustrates an example eNB receiver for data information and UCI in a PUSCH according to this disclosure.

FIG. 10 illustrates an example eNB receiver for data information and UCI in a PUSCH according to this disclosure. The embodiment of the receiver shown in FIG. 10 is for illustration only. Other embodiments could be used without departing from the scope of the present disclosure.

A received signal 1010 is filtered by filter 1020, a FFT is applied by FFT filter 1030, a selector unit 1040 selects REs 1050 used by a transmitter, an IDFT filter applies an IDFT 1060, a de-multiplexer 1070 extracts encoded HARQ-ACK symbols, if any, and places erasures in corresponding REs for data symbols and CSI symbols and finally another de-multiplexer 1080 separates encoded data symbols 1090, if any, and encoded CSI symbols 1095, if any. A reception of coded RI symbols, if any, is similar to one for coded HARQ-ACK symbols (not shown). If any of data, CSI, HARQ-ACK, or RI is not transmitted, a block in FIG. 10 corresponding to a respective receiver processing function is omitted.

One mechanism towards satisfying a demand for increased network capacity and data rates is network densification. This is realized by deploying small cells in order to increase a number of network nodes and their proximity to UEs and provide cell splitting gains. As a number of small cells increases and deployments of small cells become dense, a handover frequency and a handover failure rate can also significantly increase. By maintaining the RRC connection to the macro-cell, communication with the small cell can be optimized as control-plane (C-plane) functionalities such as mobility management, paging, and system information updates can be provided only by the macro-cell while a small-cell can be dedicated for user-data plane (U-plane) communications. If a latency of a backhaul link between network nodes (cells) is practically zero, Carrier Aggregation (CA) can be used as in REF 3 and scheduling decisions can be made by a central entity and conveyed to each network node. Moreover, UCI from a UE can be received at any network node and conveyed to the central entity to facilitate a proper scheduling decision for the UE.

When CA operation supports a limited number of cells (or carriers), such as up to 5 cells, each with a maximum of 20 MHz BW (see also REF 3) respective DL data rates or UL data rates are limited and a larger number of available cells cannot be utilized. Therefore, extending support for CA to a sufficiently large number of cells can allow for more efficient utilization of available spectrum and improve data rates and service experience for a UE particularly for operation on unlicensed bands where a large number of carriers can be available.

For DL CA operation with up to five configured cells, UE 114 can use a PUCCH Format 3 for HARQ-ACK transmission (see also REF 1 and REF 3). The eNB 102 configures UE 114 with a set of four resources for a PUCCH Format 3 transmission. The eNB 102 indicates to UE 114 one PUCCH Format 3 resource, from the set of four PUCCH Format 3 resources, through a 2-bit HARQ-ACK resource indication field that is included in DCI formats scheduling a PDSCH reception or a SPS PDSCH release to UE 114 (see also REF 2 and REF 3).

When UE 114 is configured for simultaneous HARQ-ACK and P-CSI transmission and UE 114 has a valid indication for a PUCCH Format 3 resource in a SF, UE 114 multiplexes HARQ-ACK and P-CSI (and potential SR when applicable) in a PUCCH Format 3 transmission using the indicated resource in the SF (see also REF 3). When UE 114 does not have a valid indication for a PUCCH Format 3 resource in a SF, UE 114 multiplexes HARQ-ACK and P-CSI in a PUCCH Format 2 transmission in the SF using a resource that eNB 102 configures to UE 114 through higher layer signaling (see also REF 3).

A first consequence from increasing a number of DL cells is a need to increase a granularity for a number of A-CSI reports that can be triggered by a CQI request field in a DCI format scheduling a PUSCH transmission. An existing CQI request field includes 2 bits and can only trigger A-CSI reports for one set of cells from two configured sets of cells or for one set of CSI processes from two configured sets of CSI processes, as shown in TABLE 1 or TABLE 2, respectively. When UE 114 is configured for CA operation with 16 or 32 DL cells and a capability to provide an A-CSI report for each cell is to be provided, an A-CSI report granularity of two sets of cells requires that a minimum number of A-CSI reports in a PUSCH is 8 or 16, respectively. This can result to significant overhead particularly for A-CSI reports with large payloads and also result to unnecessary transmissions of A-CSI reports for some of the cells in a set when an eNB does not require respective A-CSI reports (but cannot avoid triggering them as respective cells are included in the set of cells).

A second consequence from increasing a number of DL cells is that as UCI payloads increase, overhead for UCI transmission can become substantial and support of modulation schemes that are more spectrally efficient than QPSK, such as QAM16, can be beneficial to reduce required resources, for example by a factor of 2 for QAM16 over QPSK. For a same reason, it is beneficial to support QAM16 for A-CSI transmission in a PUSCH without data transmission and an eNB needs to indicate to a UE whether to use QPSK or QAM16 to modulate encoded UCI information.

A third consequence from increasing a number of DL cells relates to introducing new requirements for UCI multiplexing in a PUSCH. For example, PUSCH resources for multiplexing HARQ-ACK information (see also REF 2) can be insufficient when the HARQ-ACK information payload corresponds to potential PDSCH transmissions on 16 DL cells or on 32 DL cells. Insufficient PUSCH resources can be particularly likely in TDD systems where an HARQ-ACK payload in a PUSCH can correspond to PDSCH transmissions over multiple DL SFs per DL cell in addition over multiple DL cells (see also REF 3).

A fourth consequence from increasing a number of DL cells relates to a need for a UE to transmit a respectively increased number of P-CSI reports. Especially in TDD systems, where there can be a few UL SFs per frame, a periodicity for a P-CSI report can be in the order of several tens of SFs (tens of msecs) and this reduces a usefulness of P-CSI reports. Enabling a UE to transmit P-CSI reports for multiple DL cells in a same PUCCH is therefore beneficial.

A fifth consequence from increasing a number of DL cells is that collisions of P-CSI reports for different DL cells can occur, for example when respective P-CSI reporting periodicities are different. Typically, for single DL cell P-CSI reporting in a PUCCH Format 2, when transmissions of P-CSI reports for different DL cells collide in a SF, a UE transmits only one of the P-CSI reports according to pre-defined priorities (see also REF 3). It is desirable to avoid suspended transmissions of P-CSI reports for DL cells and to maximize a number of P-CSI reports in a PUCCH Format 4 according to predefined conditions.

A sixth consequence from increasing a number of DL cells is that a UE can require transmission of HARQ-ACK information and P-CSI reports for one or more DL cells in a same SF. It is desirable for the UE to transmit both the HARQ-ACK information and a maximum number of P-CSI reports for the one or more DL cells, according to predefined conditions, in a PUCCH Format 4 over a same SF.

A seventh consequence from increasing a number of DL cells is that different coding methods can be applicable depending on a total P-CSI payload or P-CSI and HARQ-ACK payload transmitted in a same PUCCH or depending on a respective PUCCH Format.

Embodiments of this disclosure provide mechanisms for enhancing a granularity for triggering A-CSI reports in a PUSCH and for controlling PUCCH resources required for multiplexing A-CSI reports in the PUSCH. Embodiments of this disclosure also provide mechanisms for enabling use of modulation schemes with increased spectral efficiency for UCI transmission in a PUCCH in order to reduce a respective resource overhead. Embodiments of this disclosure also provide mechanisms for enabling multiplexing of large HARQ-ACK payloads in a PUSCH either by multiplexing HARQ-ACK symbols next to a DMRS in each subframe slot or by multiplexing HARQ-ACK symbols over all subframe symbols available for UCI multiplexing. Embodiments of this disclosure also provide mechanisms for enhancing a reliability of P-CSI reports transmitted in a PUCCH, and for minimizing loss of P-CSI reports when multiple P-CSI reports need to be transmitted in the PUCCH. Finally, embodiments of this disclosure provide mechanisms for multiplexing HARQ-ACK information and P-CSI information for multiple cells in a PUCCH.

For the brevity of descriptions, although the embodiments of this disclosure consider that UE 114 generates HARQ-ACK information in response to a detection of a DCI format indicating SPS PDSCH (see also REF 3), this is not explicitly mentioned. Further, when UE 114 is configured a parameter by eNB 102, unless otherwise noted, the configuration is by higher layer signaling, such as RRC signaling while when UE 114 is dynamically indicated a parameter by eNB 102, the indication is by physical layer signaling such as by a DCI format.

Embodiment 1: Enhancing A-CSI Triggering

The first embodiment considers an association between a SF where an eNB, such as eNB 102, triggers an A-CSI report from a UE, such as UE 114, and a set of serving cells that UE 114 reports A-CSI is based on the triggering by eNB 102.

In a first approach, a CQI request field in a DCI format scheduling a PUSCH transmission to UE 114 includes a predefined number of bits such as 2 bits. A mapping of the 2 bits can include a SF where eNB 102 transmits the DCI format to UL 114. The eNB 102 configures the UE 114 with a number of SF sets such as two SF sets. If UE 114 detects a DCI format scheduling a PUSCH transmission that includes a CQI request field in SF set 0 then, depending on the (binary) CQI request field value, UE 114 reports A-CSI (including no A-CSI reporting) according to one of the first four entries in TABLE 3 (assuming UE 114 is configured a PDSCH TM associated with a single CSI process). If UE 114 detects a DCI format scheduling a PUSCH transmission that includes a CQI request field in SF set 1 then, depending on the CQI request field value, UE 114 reports A-CSI (including no A-CSI reporting) according to one of the first two and the last two entries in TABLE 3. For example, to provide A-CSI reports for sixteen cells, eNB 102 can configure UE 114 with four sets of cells where the four sets of cells have no common cells among them and each set includes four different cells. When UE 114 is configured with a PDSCH TM associated with multiple CSI processes, such as TM 10 (REF 3), the "serving cells" in TABLE 3 can be replaced by "CSI processes" similar to TABLE 1 and TABLE 2.

TABLE 3

Mapping of CQI request field and SF sets to CSI reports

| | {Value of CQI request field, SF Set} | Description |
|---|---|---|
| 1 | {00, 0}, {00, 1} | No aperiodic CSI report is triggered |
| 2 | {01, 0}, {01, 1} | Aperiodic CSI report is triggered for serving cell c |
| 3 | {10, 0} | Aperiodic CSI report is triggered for a $1^{st}$ set of serving cells configured by higher layers |
| 4 | {11, 0} | Aperiodic CSI report is triggered for a $2^{nd}$ set of serving cells configured by higher layers |
| 5 | {10, 1} | Aperiodic CSI report is triggered for a $3^{rd}$ set of serving cells configured by higher layers |
| 6 | {11, 1} | Aperiodic CSI report is triggered for a $4^{th}$ set of serving cells configured by higher layers |

In a second approach, a CQI request field in a DCI format scheduling a PUSCH transmission to UE 114 includes a predefined number of bits such as 2 bits. A mapping of the 2 bits can include a cell where UE 114 transmits the PUSCH conveying an A-CSI report. An eNB, such as eNB 102, configures UE 114 with a number of sets of cells such as two sets. When UE 114 transmits the PUSCH in a cell from the first set of cells (cell set 0) then, depending on the CQI request field value, UE 114 reports A-CSI (including no A-CSI reporting) according to one of the first four entries in TABLE 4 (assuming UE 114 is configured a PDSCH TM associated with a single CSI process). When UE 114 transmits the PUSCH in a cell from the second set of cells (cell set 1) then, depending on the CQI request field value, the UE reports A-CSI (including no A-CSI reporting) according to one of the first two and the last two entries in TABLE 4. For example, to provide A-CSI reports for sixteen cells, eNB 102 can configure UE 114 with four sets of cells where the four sets of serving cells have no common cells among them each set includes four different cells. When UE 114 is configured with a PDSCH TM associated with multiple CSI processes, such as TM 10 (REF 3), the "serving cells" in TABLE 4 can be replaced by "CSI processes" similar to TABLE 1 and TABLE 2.

TABLE 4

Mapping of CQI request field and Cell sets to A-CSI reports

| | {Value of CQI request field, PUSCH Cell Set} | Description |
|---|---|---|
| 1 | {00, 0}, {00, 1} | No aperiodic CSI report is triggered |
| 2 | {01, 0}, {01, 1} | Aperiodic CSI report is triggered for serving cell c |
| 3 | {10, 0} | Aperiodic CSI report is triggered for a $1^{st}$ set of serving cells configured by higher layers |
| 4 | {11, 0} | Aperiodic CSI report is triggered for a $2^{nd}$ set of serving cells configured by higher layers |
| 5 | {10, 1} | Aperiodic CSI report is triggered for a $3^{rd}$ set of serving cells configured by higher layers |
| 6 | {11, 1} | Aperiodic CSI report is triggered for a $4^{th}$ set of serving cells configured by higher layers |

In a third approach, a CQI request field includes a number of bits that depends on a number of configured cells for UE 114. When the number of cells is equal to or smaller than a predetermined value, such as 5, the CSI request field includes 2 bits; otherwise, when the number of cells is larger than the predetermined value, such as 5, the CSI request field includes a larger number of bits such as 3 bits. A mapping of the 2 bits can be, for example, as in TABLE 1 or as in TABLE 2. A mapping of the 3 bits can be, for example, as in TABLE 5 (assuming UE 114 is configured a PDSCH TM associated with a single CSI process). For example, to provide A-CSI reports for 32 cells, eNB 102 can configure UE 114 with 6 sets of cells where the first 2 sets can include 6 cells and the last 4 sets can include 5 cells and where the 6 sets of cells have no common serving cells among them each set includes different serving cells. For example, eNB 102 can configure UE 114 with 6 sets of cells where each set includes 6 cells and some sets of cells include a same cell. When UE 114 is configured with a PDSCH TM associated with multiple CSI processes, such as TM 10 (REF 3), the "serving cells" in TABLE 5 can be replaced by "CSI processes" similar to TABLE 1 and TABLE 2.

TABLE 5

Mapping of 3-bit CQI request field to A-CSI reports

| | Value of CQI request field | Description |
|---|---|---|
| 1 | 000 | No Aperiodic CSI report is triggered |
| 2 | 001 | Aperiodic CSI report is triggered for serving cell c |
| 3 | 010 | Aperiodic CSI report is triggered for a $1^{st}$ set of serving cells configured by higher layers |
| 4 | 011 | Aperiodic CSI report is triggered for a $2^{nd}$ set of serving cells configured by higher layers |
| 5 | 100 | Aperiodic CSI report is triggered for a $3^{rd}$ set of serving cells configured by higher layers |
| 6 | 101 | Aperiodic CSI report is triggered for a $4^{th}$ set of serving cells configured by higher layers |
| 7 | 110 | Aperiodic CSI report is triggered for a $5^{th}$ set of serving cells configured by higher layers |
| 8 | 111 | Aperiodic CSI report is triggered for a $6^{th}$ set of serving cells configured by higher layers |

In order to maintain a same DCI format size regardless of a number of cells eNB 102 configures to UE 114, UE 114 can implicitly obtain an additional bit for the CQI request field when a number of configured cells is larger than a predetermined value such as 5 cells. For example, a cyclic shift for DMRS and orthogonal cover code (OCC) index field of 3 bits in a DCI format scheduling a PUSCH transmission (see also REF 2) can be assumed to actually have 2 bits, for example indicating every other value of the 8 possible values when 3 bits, and the third bit can be interpreted as supplementing the CQI request field when the bits of the CQI request field do not all have a zero value, that is, when eNB 102 triggers an A-CSI report from UE 114.

In a fourth approach, the mechanisms of the first and third approaches or of the second and third approaches can be combined. In particular, for combining the first and third approaches, eNB 102 can configure UE 114 with a number of SF sets, such as two SF sets, for associating a set of cells for A-CSI reporting. A CQI request field includes 2 bits when UE 114 has a number of configured cells that is smaller than or equal to a predetermined value, such as 5 cells, and includes a larger number of bits, such as 3 bits, when UE 114 has a number of configured cells larger than the value. A mapping can be, for example, as in TABLE 6, assuming UE 114 is configured a PDSCH TM associated with a single CSI process. For example, to provide A-CSI reports for $N_{cells}^{DL}=32$ cells, eNB 102 can configure UE 114 with 12 sets of cells where each set can include 4 cells and two or more sets can have common cells. A similar mechanism can apply for combining the second and third approaches. When UE 114 is configured with a PDSCH TM associated with multiple CSI processes, such as TM 10 (REF 3), the "serving cells" in TABLE 6 can be replaced by "CSI processes" similar to TABLE 1 and TABLE 2.

TABLE 6

Mapping of 3-bit CQI request field and SF sets to A-CSI reports in a PUSCH

| | {Value of CQI request field SF Set} | Description |
|---|---|---|
| 1 | {000, 0}, {000, 1} | No Aperiodic CSI report is triggered |
| 2 | {001, 0}, {001, 1} | Aperiodic CSI report is triggered for serving cell c |
| 3 | {010, 0} | Aperiodic CSI report is triggered for a $1^{st}$ set of serving cells configured by higher layers |
| 4 | {011, 0} | Aperiodic CSI report is triggered for a $2^{nd}$ set of serving cells configured by higher layers |
| 5 | {100, 0} | Aperiodic CSI report is triggered for a $3^{rd}$ set of serving cells configured by higher layers |
| 6 | {101, 0} | Aperiodic CSI report is triggered for a $4^{th}$ set of serving cells configured by higher layers |
| 7 | {110, 0} | Aperiodic CSI report is triggered for a $5^{th}$ set of serving cells configured by higher layers |
| 8 | {111, 0} | Aperiodic CSI report is triggered for a $6^{th}$ set of serving cells configured by higher layers |
| 9 | {010, 1} | Aperiodic CSI report is triggered for a $7^{th}$ set of serving cells configured by higher layers |
| 10 | {011, 1} | Aperiodic CSI report is triggered for a $8^{th}$ set of serving cells configured by higher layers |
| 11 | {100, 1} | Aperiodic CSI report is triggered for a $9^{th}$ set of serving cells configured by higher layers |
| 12 | {101, 1} | Aperiodic CSI report is triggered for a $10^{th}$ set of serving cells configured by higher layers |
| 13 | {110, 1} | Aperiodic CSI report is triggered for a $11^{th}$ set of serving cells configured by higher layers |
| 14 | {111, 1} | Aperiodic CSI report is triggered for a $12^{th}$ set of serving cells configured by higher layers |

Embodiment 2: Using Modulation with Increased Spectral Efficiency

The second embodiment considers enhancements in spectral efficiency for UCI transmission by supporting modulation schemes with higher spectral efficiency than QPSK.

For large UCI payloads, spectral efficiency and resource utilization can be improved by increasing an order of a modulation scheme a UE, such as UE 114, uses to transmit UCI to an eNB, such as eNB 102. For example, instead of QPSK that can support transmission of two bits per RE, UE 114 can use QAM16 that can support transmission of four bits per RE to transmit UCI. The eNB 102 can determine a link quality, such as a SINR, for a PUCCH transmission from UE 114 in a cell. For example, based on an SRS transmission from UE 114 in a cell or based on a BLER for data TBs transmitted from UE 114 in a PUSCH in the cell, eNB 102 can estimate a SINR experienced by transmissions from UE 114 in the cell. The eNB 102 can then decide whether to configure UE 114 to use QPSK or a higher modulation order, such as QAM16, for UCI transmission in a PUCCH in the cell.

When UE 114 is configured by eNB 102 to use QAM16 modulation for UCI transmission in a PUCCH, a modulation order used by UE 114 to transmit UCI in the PUCCH can vary between QPSK and QAM16 depending on a UCI payload that UE 116 needs to transmit in predetermined PUCCH resources (RBs).

In a first case, for a set of encoded UCI bits that consists of a first subset of encoded UCI bits and of a second subset of encoded UCI bits, UE 114 can apply QPSK modulation for transmission of the first subset of encoded UCI bits and apply QAM16 modulation for transmission of the second subset of encoded UCI bits. For example, for the PUCCH structure in FIG. 4 having 6×12=72 REs per slot when there is no SRS transmission in a last symbol of the second slot, 144 encoded UCI bits can be modulated and mapped to the 72 REs using QPSK (transmission of the modulated encoded bits can be repeated in the second slot possibly in a different part of the operating BW—see also REF 1 and REF 3). For 216 encoded UCI bits, 72 can be modulated using QPSK (2 bits per RE) and 144 can be modulated using QAM16 (4 bits per RE).

In a second case and for a TDD system, for a set of UL SFs that consists of a first subset of UL SFs and of a second subset of UL SFs, where each UL SF in the first set of UL SFs is associated with a bundling window size $M_{W1}$ (see also REF 3) that is smaller than the a bundling window size $M_{W2}$ that each UL SF in the second set of UL SFs is associated with, UE 114 can modulate HARQ-ACK information using QPSK in the first subset of UL SFs and using QAM16 in the second subset of UL SFs. For example, for a TDD system with UL/DL configuration 1 (see also REF 1), a bundling window size can be either $M_W=1$ or $M_W=2$ (see also REF 3). When UE 114 is configured with 40 cells and has an HARQ-ACK payload of 40 bits in a first UL SF associated with $M_W=1$ and of 2×40=80 bits in a second UL SF associated with $M_W=2$, UE 114 transmits HARQ-ACK in a PRB using the PUCCH structure in FIG. 4 having 6×12=72 REs per slot and encodes HARQ-ACK information using a rate ⅓ TBCC with a CRC of 8 bits. Then, for the first UL SF, UE 114 has 3×(40+8)=144 encoded bits that can multiplex in each slot to 72 symbols using QPSK. For the second UL SF, UE 114 has 3×(80+8)=264 encoded bits that can multiplex in each slot to 66 REs using QAM16 and use additional rate matching to repeat a mapping of 6 QAM16 symbols to remaining 6 REs in each slot (same or different 6 QAM16 symbols can be repeated in each slot) in order to map modulated symbols in each RE in a slot.

Figure 11:
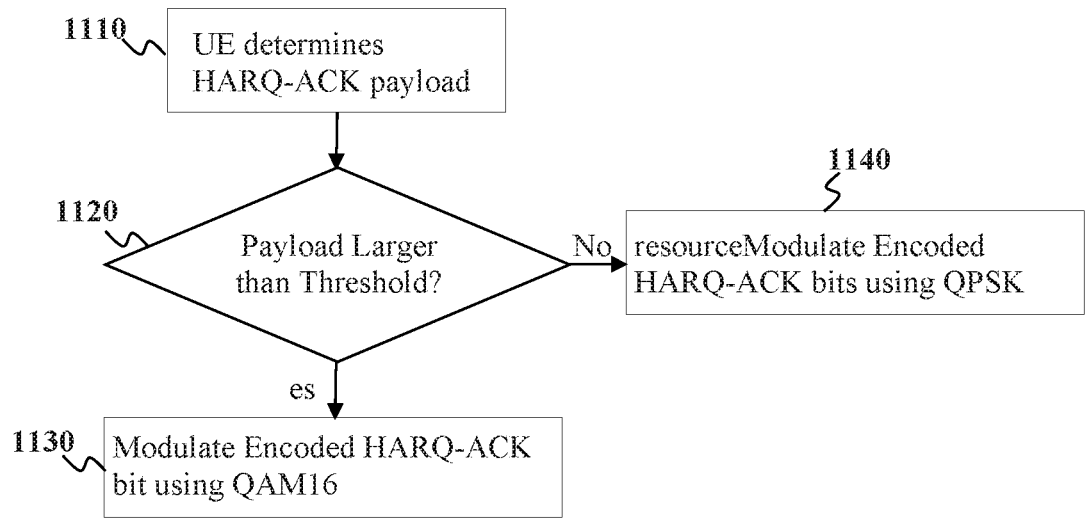
FIG. 11 illustrates a determination of a modulation scheme for HARQ-ACK information bits depending on a respective payload according to this disclosure.

FIG. 11 illustrates a determination of a modulation scheme for HARQ-ACK information bits depending on a respective payload according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

UE 114 is configured for CA operation and determines a HARQ-ACK payload 1110 (including CRC bits). The determination can be based on a number of configured cells or on a number of data TBs supported by a configured PDSCH TM per cell and on a bundling window size $M_w$ for a TDD system (see also REF 3). The UE 114 subsequently examines whether the HARQ-ACK payload is larger than a threshold 1120. The threshold can depend on a number of RBs for HARQ-ACK transmission and, as is subsequently described, the threshold can be mapped to a code rate and can be either predetermined in a system operation or be configured to UE 114 by eNB 102. If the HARQ-ACK payload is larger than the threshold, UE 114 modulates the encoded HARQ-ACK bits using QAM16 1130. If the HARQ-ACK payload is not larger than the threshold, UE 114 modulates the encoded HARQ-ACK bits using QPSK 1140.

When UE 114 applies only QPSK modulation for P-CSI transmission in a PUCCH, UE 114 can be configured with more than one set of PUCCH resources and select a PUCCH resource from the set of resources depending on a P-CSI payload that UE 114 needs to transmit as this determines a resulting code rate. For example, UE 114 can be configured with 1 RB and with 2 RBs for P-CSI transmission in a PUCCH Format 4 and UE 114 can transmit the P-CSI information in the 1 RB when the payload is 40 bits and results to a code rate smaller than or equal to a configured code rate, and transmit the P-CSI information in the 2 RBs when the payload is 72 bits and would result in a code rate larger than the configured code rate at least when the transmission is in 1 RB. Therefore, for a P-CSI payload of $O_{P-CSI}$ information bits, a configured code rate r, a first PUCCH Format 4 resource of $M_{RB,1}^{PUCCH}$ RBs and a second PUCCH Format 4 resource of $M_{RB,2}^{PUCCH}$ RBs, where $M_{RB,2}^{PUCCH} > M_{RB,1}^{PUCCH}$, UE 114 selects for P-CSI transmission the first PUCCH Format 4 resource when $O_{P-CSI} \le 2 \cdot M_{RB,1}^{PUCCH} \cdot N_{sc}^{RB} \cdot N_{symb}^{PUCCH} \cdot r$; otherwise, UE 114 selects for P-CSI transmission the second PUCCH Format 4 resource. When UE 114 applies TBCC encoding with CRC, $O_{CRC}$ bits can be added to the $O_{P-CSI}$ bits.

A similar configuration of PUCCH Format 4 resources having different number of RBs can apply for transmission of other UCI types, such as RI or HARQ-ACK. For example, for HARQ-ACK transmission, eNB 102 can indicate a PUCCH Format 4 resource adjusting a code rate to a value that eNB 102 determines for the HARQ-ACK transmission from UE 114.

Embodiment 3: Multiplexing Large HARQ-ACK Payloads in PUSCH

The third embodiment considers multiplexing methods for large UCI payloads in a PUSCH.

When HARQ-ACK transmission on a PUSCH is limited to the 2 SF symbols next to the DMRS in each SF slot and when a PUSCH is transmitted over a small number of PRBs, a number of REs available for HARQ-ACK multiplexing in the PUSCH can be insufficient. For example, for a PUSCH transmission over 2 PRBs, a number of encoded HARQ-ACK and CRC bits that UE 114 can multiplex using QPSK modulation is 2 (bits/RE for QPSK)×2 (number of PRBs)×12 (number of REs per PRB)×4 (number of SF symbols where HARQ-ACK is multiplexed)=192. For an HARQ-ACK information payload of 128 bits, for example for a TDD system with a bundling window size $M_w=4$ when UE 114 is configured with 16 cells and a PDSCH TM supporting 2 data TBs and 8 CRC bits, this corresponds to coding rate of about 0.71 that can be too large to meet a desired HARQ-ACK reception reliability target at least when UE 114 does not experience a high UL SINR.

A reliability of HARQ-ACK transmission in a PUSCH can be improved by one of the following approaches or by combinations of them.

A first approach is for UE 114 to perform adaptive bundling over $O_{HARQ-ACK}$ HARQ-ACK information bits so that a resulting payload of $O_{ACK,bundle}$ bits is obtained after bundling and the condition in Equation 3 (see also REF 2) is satisfied $$\left\lceil \frac{O_{ACK,bundle} \cdot M_{sc}^{PUSCH\text{-}initial} \cdot N_{symb}^{PUSCH\text{-}initial} \cdot \beta_{offset}^{HARQ\text{-}ACK}}{\sum_{r=0}^{C-1} K_r} \right\rceil \leq 4 \cdot M_{sc}^{PUSCH} \quad (3)$$

UE 114 can be configured to apply spatial domain bundling for HARQ-ACK multiplexing in a PUSCH. Spatial domain bundling applies on HARQ-ACK information corresponding to reception of 2 data TBs in each respective PDSCH (see also REF 2) and results to a single HARQ-ACK bit for a total HARQ-ACK payload of $O_{ACK,spatial}$ bits. When $O_{ACK,spatial}$ satisfies the condition in Equation 3, with $O_{ACK,bundle} = O_{ACK,spatial}$, UE 114 does not perform additional bundling. When $O_{ACK,spatial}$ does not satisfy the condition in Equation 3, UE 114 can either transmit the HARQ-ACK information after spatial bundling with reduced reliability or perform additional bundling in the cell domain or, for a TDD system, in the time domain.

A second approach is for UE 114 to select a PUSCH transmission, when multiple PUSCH transmissions in a same SF, that satisfies the condition in Equation 3 with $O_{ACK,bundle}$ replaced by $O_{HARQ-ACK}$. When several PUSCH transmissions in a same SF satisfy the condition in Equation 3, UE 114 selects a PUSCH transmitted in a cell with the smallest index or a PUSCH resulting to the smallest value for $$\left\lceil \frac{O \cdot M_{sc}^{PUSCH\text{-}initial} \cdot N_{symb}^{PUSCH\text{-}initial} \cdot \beta_{offset}^{HARQ\text{-}ACK}}{\sum_{r=0}^{C-1} K_r} \right\rceil.$$

When no PUSCH transmission satisfies Equation 3 for $O_{ACK,bundle}$ replaced by $O_{HARQ-ACK}$, the second approach can be combined with the first approach and, for example, the UE can select a PUSCH satisfying Equation 3 either based on a serving cell with a smallest index or on a smallest value for $$\left\lceil \frac{O_{bundle} \cdot M_{sc}^{PUSCH\text{-}initial} \cdot N_{symb}^{PUSCH\text{-}initial} \cdot \beta_{offset}^{HARQ\text{-}ACK}}{\sum_{r=0}^{C-1} K_r} \right\rceil.$$

Alternatively, when UE 114 needs to transmit an HARQ-ACK payload $O_{HARQ-ACK}$ and the condition in Equation 1 is not satisfied for $O_{HARQ-ACK}$, UE 114 determines the maximum HARQ-ACK payload $O_{HARQ-ACK}$ that satisfies the condition in Equation 1 by not reporting $O_{HARQ-ACK} - O_{ACK,reduced}$ HARQ-ACK information bits corresponding, for example, to cells with the highest indexes. For example, when a UE needs to transmit an HARQ-ACK payload of $O_{HARQ-ACK}=16$ bits corresponding to PDSCH receptions in respective 16 cells and Equation 1 is not satisfied for $O_{HARQ-ACK}=16$ and is satisfied for a largest value of $O_{ACK,reduced}=10$ bits, UE 114 drops transmission of HARQ-ACK bits corresponding to $O_{HARQ-ACK} - O_{ACK,reduced}=6$ cells with the highest indexes.

A third approach is to require UE 114 to also support PUSCH and PUCCH transmissions in a same SF. Alternatively, a similar requirement can be conditioned on a number of cells that UE 114 can be configured to support for a FDD system, or on a number of cells and a bundling window size $M_W$ for a TDD system (that is, on specific UL/DL configurations). It is also possible to partition HARQ-ACK bits for the set of C cells into two subsets, $C_{sub,1}$ and $C_{sub,2}$, where UE 114 transmits HARQ-ACK bits for cells in $C_{sub,1}$ in a PUCCH and transmits HARQ-ACK bits for cells in $C_{sub,2}$ in a PUSCH.

A fourth approach, when UE 114 is not configured to transmit PUCCH and PUSCH in a same SF, is for UE 114 to drop a PUSCH transmission when Equation 1 cannot be satisfied and transmit the HARQ-ACK information in a PUCCH.

A fifth approach is to use a same multiplexing for HARQ-ACK information in a PUSCH as for CQI/PMI in a PUSCH. This can provide additional resources for HARQ-ACK multiplexing in a PUSCH beyond the ones included in the two symbols around the DMRS symbol in each slot of a SF.

In a first realization, HARQ-ACK multiplexing can be performed first and CQI multiplexing, if any, can be performed after HARQ-ACK multiplexing. This ensures that REs in a SF are allocated with priority to HARQ-ACK transmission. Therefore, the inputs to the data and HARQ-ACK multiplexing are the coded bits of the HARQ-ACK information denoted by $a_0, a_1, a_2, a_3, \ldots, a_{N_L \cdot Q_{CQI}-1}$ and the coded bits of the data TB denoted by $f_0, f_1, f_2, f_3, \ldots f_{G-1}$. If HARQ-ACK is mapped only to one layer, $N_L = 1$. The output of the data and HARQ-ACK multiplexing operation is denoted by $g_0, g_1, g_2, g_3 \ldots g_{H'-1}$, where $H = (G + N_L \cdot Q_{HARQ-ACK})$ and $H' = H/(N_L \cdot Q_m)$, and where $g_i$, $i=0, \ldots, H'-1$ are column vectors of length $(Q_m \cdot N_L)$. H is the total number of coded bits allocated for data and HARQ-ACK information across the $N_L$ transmission layers of the data TB. A channel interleaver as described in REF 2 implements a time-first mapping of modulation symbols onto the transmit waveform.

In a second realization, CQI multiplexing can remain unchanged and HARQ-ACK multiplexing can be performed after CQI multiplexing. HARQ-ACK multiplexing can be in a similar manner as described for the first realization with the exception of the placement of REs used for HARQ-ACK transmission in a PUSCH.

Figure 12:
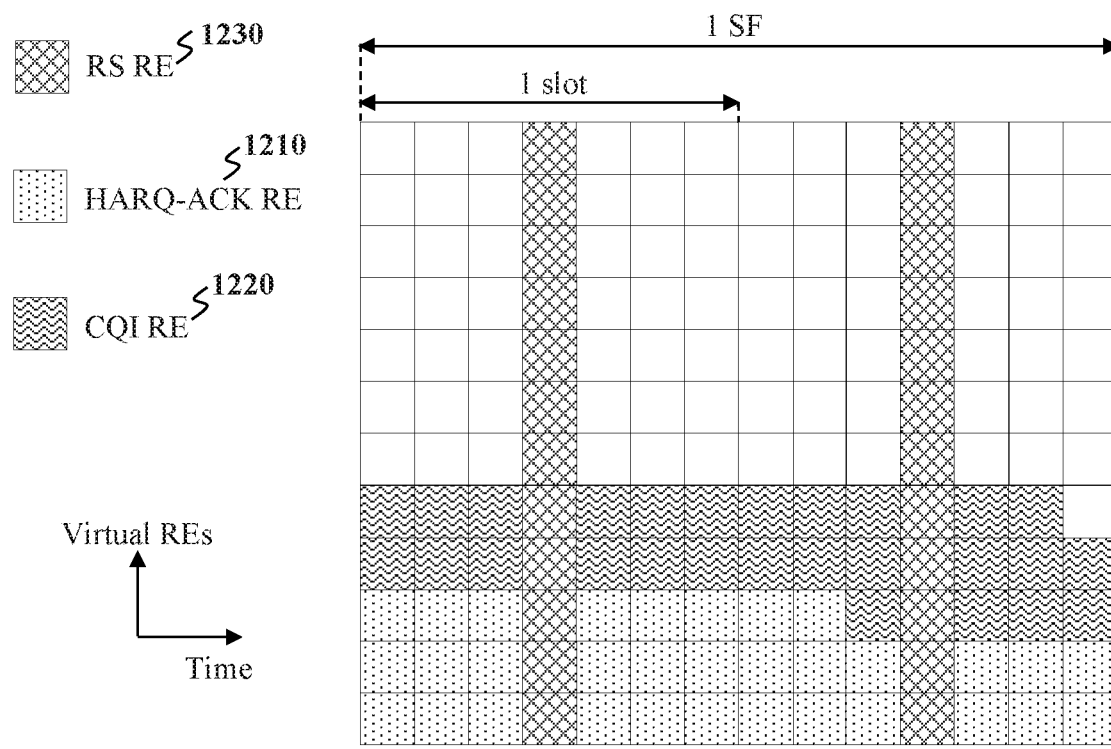
FIG. 12 illustrates a multiplexing of coded HARQ-ACK information bits in a PUSCH according to this disclosure.

FIG. 12 illustrates a multiplexing of coded HARQ-ACK information bits in a PUSCH according to this disclosure. The embodiment shown in FIG. 12 is for illustration only. Other embodiment shown in FIG. 12 is for illustration only. Other embodiments could be used without departing from the scope of the present disclosure.

Using a time-first mapping, and according to the first realization, a mapping of HARQ-ACK modulated symbols to REs 1210 starts from a first symbol of a SF and a first RE of PUSCH RBs (one RB is illustrated for simplicity), continues in remaining SF symbols, then continues in a second RE of the first symbol of the SF, and so on. A time-first mapping also applies for mapping CQI modulated symbols to REs 1220 and a first CQI RE is immediately after a last HARQ-ACK RE. The REs 1230 in SF symbols used for DMRS transmission are excluded from UCI mapping. For the second realization, the UCI mapping is same as for the first realization with the exception that HARQ-ACK REs and CQI REs are inter-changed.

Embodiment 4: P-CSI Reporting for DL CA

The fourth embodiment considers methods and apparatus for enhancing a reliability of P-CSI reports transmitted in a same PUCCH over a same SF for cells from a set of cells eNB 102 configures to UE 114 for DL CA operation, and for minimizing loss of P-CSI reports when UE 114 needs to transmit P-CSI reports for multiple cells in a PUCCH over a same SF. In SFs that are configured to a UE for potential SR transmission, a SR information bit is always assumed to be jointly coded with P-CSI information bits (or with HARQ-ACK information bits) and this is not further explicitly discussed in the following.

The eNB 102 configures by higher layer signaling, such as RRC signaling, a set of cells for DL CA to a UE. In a first alternative, eNB 102 also configures by higher layer signaling, such as RRC signaling, UE 114 with one or more subsets of cells for P-CSI reporting in a PUCCH where UE 114 transmits P-CSI reports for each subset of cells in a same PUCCH. A subset of cells can include one or more cells and a PUCCH can correspond to one of multiple PUCCH formats, such as PUCCH Format 2 or PUCCH Format 4, determined for example according to a total number of P-CSI reports for a respective subset of cells. For example, UE 114 uses PUCCH format 2 to transmit a P-CSI report for a single cell in a SF and uses PUCCH Format 4 to transmit P-CSI reports for multiple cells in a SF. eNB 102 also configures by higher layer signaling, such as RRC signaling, UE 114 with a periodicity for the P-CSI report for each DL cell and with a respective resource for PUCCH Format 2 and for PUCCH Format 4.

In a second alternative, eNB 102 configures by higher layer signaling to UE 114 a periodicity for transmission of a P-CSI report for each cell from the set of cells. UE 114 can transmit P-CSI reports for multiple cells, determined according to respective periodicities, in a PUCCH Format 4 in a respective configured resource of one or more RBs over a SF; otherwise, when UE 114 transmits a P-CSI report only for a single cell, UE 114 can transmit the P-CSI report in a PUCCH Format 2 in a respective configured resource over a SF. Therefore, in the second alternative, UE 114 transmits P-CSI reports for a subset of the set of the cells in a PUCCH over a SF but the subset of cells is time varying. The PUCCH resource and the PUCCH format can also be time varying and a respective configuration can be according to a SF pattern. For example, when a P-CSI reporting periodicity for some cells from the set of cells is 1 frame and a P-CSI reporting periodicity for remaining cells from the set of cells is 2 frames, starting from a frame with an even index, eNB 102 can independently configure to UE 114 two PUCCH Format 4 resources for transmission of P-CSI reports and UE can use the first PUCCH Format 4 resource to transmit P-CSI reports for cells in even-indexed frames (assuming that a respective payload results to a code rate for P-CSI transmission in the first PUCCH Format 4 resource that is not larger than a configured code rate) and can use the second PUCCH resource to transmit P-CSI reports for cells in odd-indexed frames (assuming that a respective payload results to a code rate for transmission in the first PUCCH Format 4 resource that is larger than the configured code rate).

Figure 13:
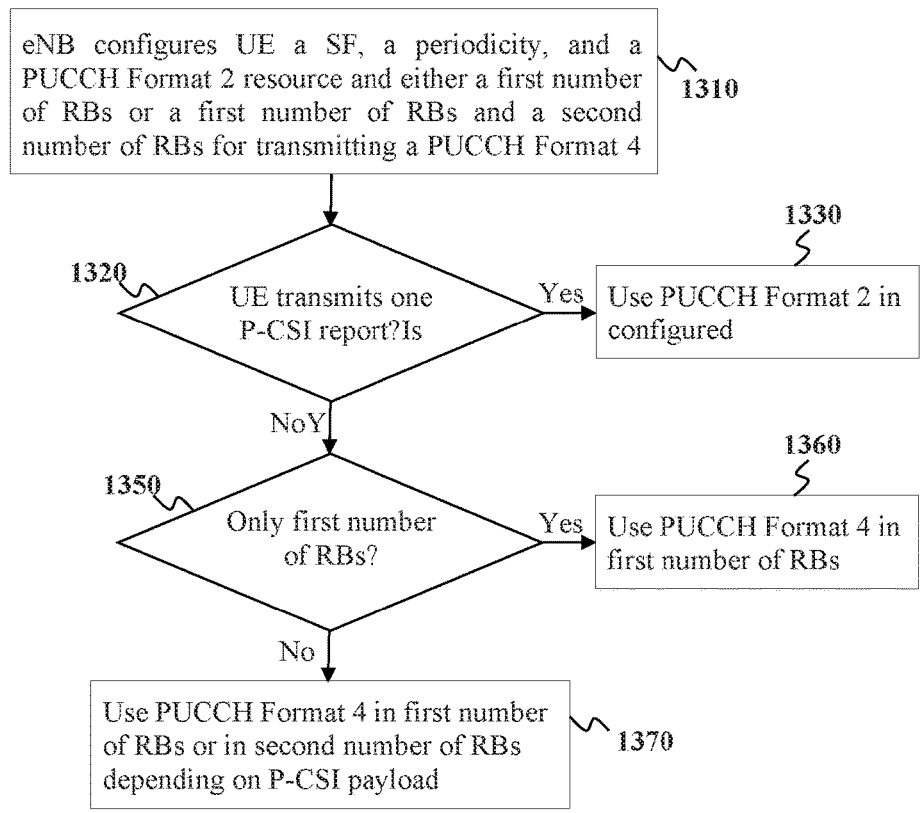
FIG. 13 illustrates a transmission by a UE of P-CSI reports using different PUCCH formats depending on a payload of the P-CSI reports in different SFs according to this disclosure.

FIG. 13 illustrates a transmission by a UE of P-CSI reports using different PUCCH formats depending on a payload of the P-CSI reports in different SFs according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a mobile station.

The eNB 102 configures UE 114 a SF, a periodicity, and a PUCCH Format 2 resource for transmitting a P-CSI report for each configured cell (see also REF 3 and REF 4) and the eNB 102 also configures UE 114 either a first number of RBs or a first number of RBs and a second number of RBs for transmitting a PUCCH Format 4 where the first number of RBs is smaller than the second number of RBs 1310. The eNB 102 and UE 114 determine whether or not a number of P-CSI reports for UE 114 to transmit in a SF is larger than one 1320. When the number of P-CSI reports is one, UE 114 and eNB 102 consider the PUCCH Format 2 and the associated resource to transmit and to receive, respectively, the P-CSI report 1330. When the number of P-CSI reports is larger than one and UE 114 is configured only a first number of RBs for transmission of a PUCCH Format 4, UE 114 and eNB 102 consider PUCCH Format 4 to transmit and receive, respectively, the P-CSI reports in the first number of RBs 1340. When the number of P-CSI reports is larger than one and UE 114 is configured a first number of RBs and a second number of RBs for transmission of a PUCCH Format 4, UE 114 and eNB 102 consider PUCCH Format 4 to transmit and receive, respectively, the P-CSI reports either in the first number of RBs or in the second number of RBs depending on a total payload of the P-CSI reports 1350.

The eNB 102 can activate and deactivate cells from the set of cells that eNB 102 configures to UE 114 for DL CA operation at a faster rate than a reconfiguration of the set of cells. When eNB 102 deactivates a cell, UE 114 does not report P-CSI for the deactivated cell as eNB 102 does not transmit to UE 114 on the deactivated cell and UE 114 transmits P-CSI reports in a same PUCCH only for activated cells from a subset of DL cells.

For the purposes of CSI reporting, the concept of cell activation or deactivation can be extended to include whether or not a cell is available for an eNB to transmit to a UE. This availability can exist in case the cell operates on unlicensed spectrum where the cell is not available for transmission from eNB 102 when a corresponding spectrum is used by other devices. UE 114 can determine the availability of a cell based on a presence of a RS that UE 114 uses to determine a CSI for the cell and UE 114 can consider the cell as activated when UE 114 determines availability for the RS.

UE 114 transmits HARQ-ACK information to eNB 102 regarding a correct or incorrect reception of a data TB conveying activation or deactivation commands for some of the cells that eNB 102 configured to UE 114 for DL CA operation. When the HARQ-ACK information is incorrectly detected by eNB 102, UE 114 and eNB 102 can have a different understanding of the activated or deactivated cells and, consequently, a different understanding of cells that UE 114 transmits P-CSI reports to eNB 102 in a PUCCH. Moreover, when an activation or deactivation command for a cell from eNB 102 is correctly detected by UE 114, there can be an ambiguity period between eNB 102 and UE 114 regarding when UE 114 applies the respective command. To overcome such possible ambiguities, eNB 102 can decode a transmitted codeword conveying P-CSI reports from UE 114 according to multiple hypotheses corresponding to whether or not UE 114 detected or applied activation or deactivation commands for respective cells. The eNB 102 can select as a correct hypothesis the one resulting to a positive test for a CRC that is included in the codeword conveying P-CSI reports.

Figure 14:
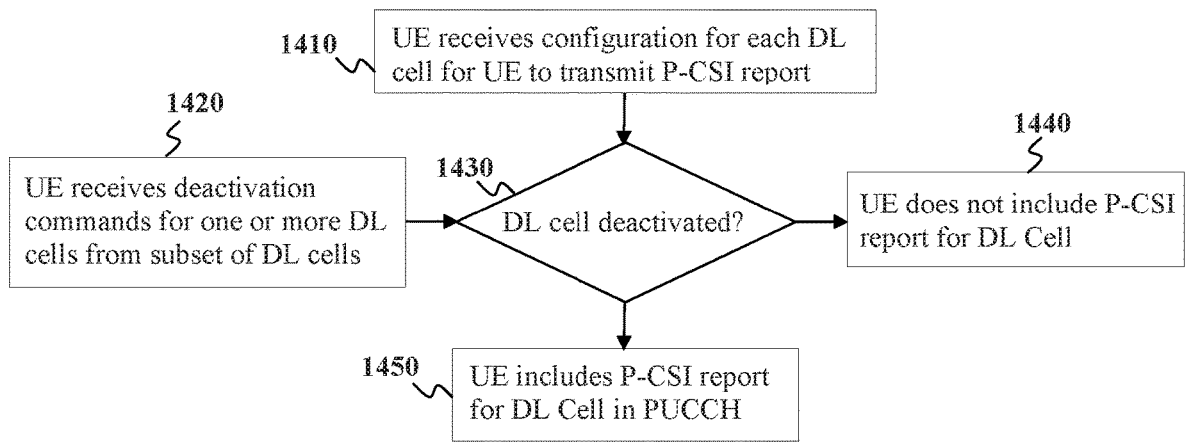
FIG. 14 illustrates a determination by a UE of P-CSI reports to transmit in a PUCCH according to this disclosure.

FIG. 14 illustrates a determination by a UE of P-CSI reports to transmit in a PUCCH according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a mobile station.

UE 114 receives from eNB 102 a configuration to transmit a P-CSI report for each respective cell from a set of cells that UE 114 is configured by eNB 102 for DL CA operation 1410. UE 114 subsequently receives deactivation commands, for example by physical layer signaling or by medium access control (MAC) signaling, for one or more cells from the set of cells 1420. Based on the detection, if any, of signaling deactivating the one or more cells, UE 114 determines cells for transmitting respective P-CSI reports in a PUCCH 1430 where UE 114 transmits a P-CSI report for an activated cell 1440 and UE 114 does not transmit a P-CSI report for a deactivated DL cell 1450. Although deactivation of one or more activated cells was considered, similar UE functionalities apply for activation of one or more deactivated cells.

Figure 15:
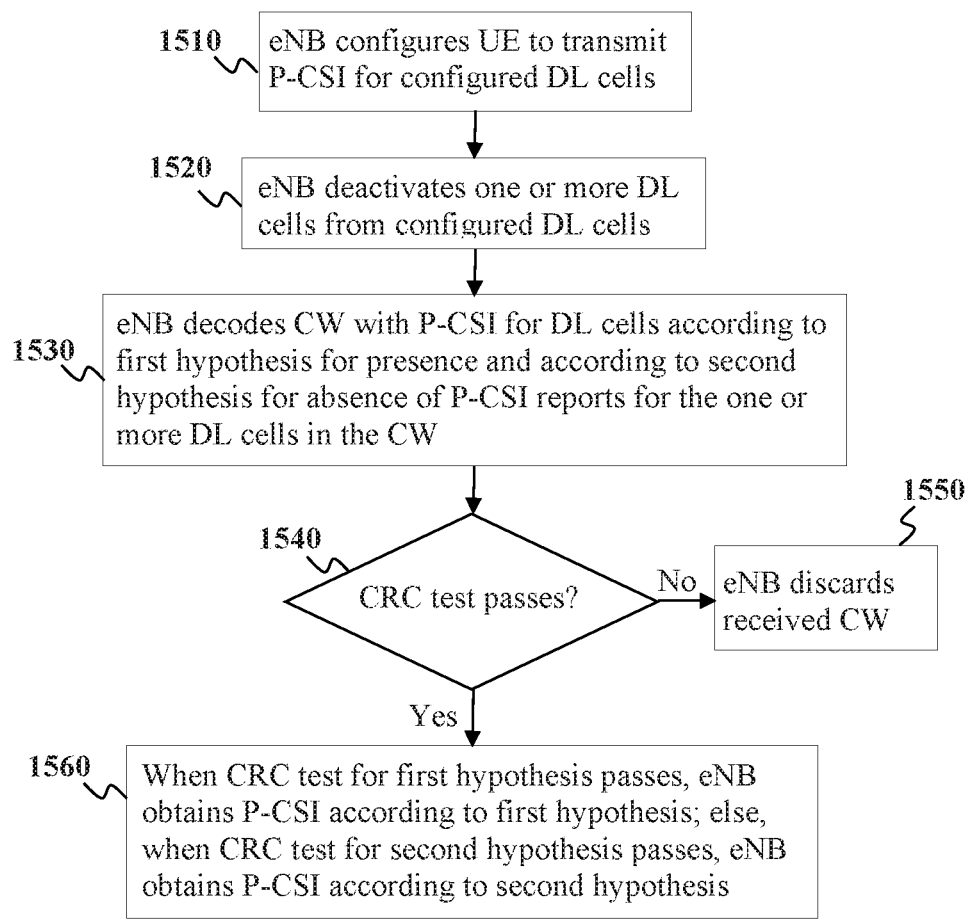
FIG. 15 illustrates a determination by an eNB of P-CSI reports to receive in the PUCCH according to this disclosure.

FIG. 15 illustrates a determination by an eNB of P-CSI reports to receive in the PUCCH according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a base station.

UE 114 receives from eNB 102 a configuration to transmit P-CSI report for each respective cell from a set of cells that eNB 102 configures to UE 114 for DL CA operation 1510. The eNB 102 subsequently deactivates for UE 114, using for example physical layer signaling of MAC signaling, one or more cells from the set of cells 1520. The eNB 102 decodes a codeword (CW) conveying P-CSI reports for cells in a PUCCH according to a first hypothesis corresponding to presence in the CW of P-CSI reports for the deactivated one or more cells and according to a second hypothesis corresponding to absence in the CW of P-CSI reports for the deactivated one or more cells 1530. After decoding according to the two hypotheses, eNB 102 performs respective two CRC checks 1540. When none of the CRC checks is positive (each CRC checksum is not zero), eNB 102 discards the P-CSI CW 1550. When the CRC check for the first hypothesis is positive, eNB 102 considers the P-CSI reports according to the first hypothesis while when the CRC check for the second hypothesis is positive, eNB 102 considers the P-CSI reports according to the second hypothesis 1560.

In the rare event that the CRC checks for both hypotheses are positive, eNB 102 can select a hypothesis corresponding to a value (ACK or NACK) of HARQ-ACK information that eNB 102 receives in response to the PDSCH or PDCCH transmission deactivating the one or more cells. It is also possible for eNB 102 to perform a single decoding operation according to the HARQ-ACK information value and eNB 102 can decode the P-CSI CW according to the first hypothesis when the value is a NACK or according to the second hypothesis when the value is an ACK. However, when there is uncertainty for a time when UE 114 applies the signaling for deactivation of the one or more cells, eNB 102 can consider the two aforementioned hypotheses regardless of the HARQ-ACK information value. Although deactivation of one or more activated cells was considered, similar functionalities for eNB 102 apply for activation of one or more deactivated cells.

The eNB 102 can configure UE 114 to transmit P-CSI reports with a same periodicity in a same SF resulting to UE 114 transmitting P-CSI reports for all cells in a same PUCCH over a single SF (single PUCCH resource). This can enable smaller power consumption for UE 114 as a single transmission is required for P-CSI reports for all cells that can also benefit from coding gains associated with a larger total P-CSI payload and from having a single CRC overhead. Another benefit is for TDD systems where, depending on the UL/DL configuration, a number of UL SFs per frame can be small and it may not be possible to configure a sufficiently small periodicity for time division multiplexed (TDM) transmissions of P-CSI reports for different cells. A periodicity for a P-CSI report can be separately configured for each cell, as an integer multiple of a smallest periodicity for a P-CSI report and UE 114 can then transmit P-CSI reports for different cells at each respective SF. The eNB 102 can configure different PUCCH resources (RBs) to UE 114 and UE 114 can use one of the configured PUCCH resources depending on a number of transmitted P-CSI reports. For example, the eNB 102 can configure UE 114 a first PUCCH resource of 1 RB and a second PUCCH resource of 2 RBs and when UE 114 transmits P-CSI reports for 4 cells with periodicity of 2 frames and P-CSI reports for 2 of the 4 cells with periodicity of 1 frame, starting from a frame with an even index, UE 114 can transmit a PUCCH over the resource of 2 RBs to convey 4 P-CSI reports in even frames and transmit a PUCCH over the resource of 1 RB to convey PUCCH in odd frames.

The above functionality requires that UE 114 has sufficient power to transmit, in a single SF, a large payload corresponding to P-CSI reports for potentially the whole set of cells that UE 114 is configured for DL CA operation. When UE 114 is power limited with respect to transmitting large payloads for P-CSI reports, eNB 102 can configure TDM of P-CSI reports for different subsets of cells. When P-CSI reports for different cells are configured with different periodicities, respective transmissions can coincide in a same SF and, for example due to power limitation or due to PUCCH resource limitation, UE 114 cannot transmit all P-CSI reports. UE 114 can rank all P-CSI reports according to their priorities (see also REF 3). For example, when a first subset of cells having a first periodicity for P-CSI reports includes Cell #0, Cell #1, and Cell #2, and a second subset of cells having a second periodicity for P-CSI reports includes Cell #3, Cell #4, Cell #5, and Cell #6, and UE 114 cannot transmit all respective P-CSI reports in a SF when the P-CSI reports coincide then, for P-CSI priorities of Cell #0>Cell #2>Cell #4>Cell #5>Cell #6>Cell #1>Cell3, UE 114 transmits P-CSI reports for Cell #0, Cell #2, Cell #4 and Cell #5.

In an alternative operation, when P-CSI reports for respective cells coincide in a SF and UE 114 transmits P-CSI reports in a single PUCCH, UE 114 can drop P-CSI reports according to predetermined priorities in order for the transmitted P-CSI reports to have a code rate that is smaller than or equal to a code rate r that is either configured to UE 114 by eNB 102 through higher layer signaling or is specified in the system operation. Then, eNB 102 can know in advance a maximum number of P-CSI reports that UE 114 can transmit based on respective PUCCH resources and the configured code rate. Using the above example where a P-CSI priority is Cell #0>Cell #2>Cell #4>Cell #5>Cell

6>Cell #1>Cell3 and for PUCCH resources of $M_{RB}^{PUCCH}$ RBs, UE 114 can transmit not only four P-CSI reports, but include additional P-CSI reports subject to a resulting code rate being smaller than the configured code rate. For example, when including a P-CSI report for Cell #6 results to a code rate that is smaller than the configured code rate and for QPSK modulation, that is $$\frac{\sum_{n=\{0,2,4,5,6\}} O_{P-CSI,n}}{SE_{mod} \cdot M_{RB}^{PUCCH} \cdot N_{sc}^{RB} \cdot N_{symb}^{PUCCH}} \le r,$$

and when including a P-CSI report for Cell #1 results to a code rate that is larger than the configured code rate, that is $$\frac{\sum_{n=\{0,2,4,5,6,1\}} O_{P-CSI,n}}{SE_{mod} \cdot M_{RB}^{PUCCH} \cdot N_{sc}^{RB} \cdot N_{symb}^{PUCCH}} > r,$$

UE 114 includes the P-CSI report for Cell #6 together with the P-CSI reports for Cell #0, Cell #2, Cell #4 and Cell #5 in a transmission of 5 P-CSI reports in a PUCCH Format 4 over $M_{RR}^{PUCCH}$ RBs. For QPSK, $SE_{mod}=2$ while for QAM16, $SE_{mod}=4$. A number of $O_{CRC}$ CRC bits can also be included as part of the P-CSI payload and then the above conditions become $$\frac{O_{CRC} + \sum_{n=\{0,2,4,5,6\}} O_{P-CSI,n}}{SE_{mod} \cdot M_{RB}^{PUCCH} \cdot N_{sc}^{RB} \cdot N_{symb}^{PUCCH}} \le r$$

and $$\frac{O_{CRC} + \sum_{n=\{0,2,4,5,6,1\}} O_{P-CSI,n}}{SE_{mod} \cdot M_{RB}^{PUCCH} \cdot N_{sc}^{RB} \cdot N_{symb}^{PUCCH}} > r.$$

Figure 16:
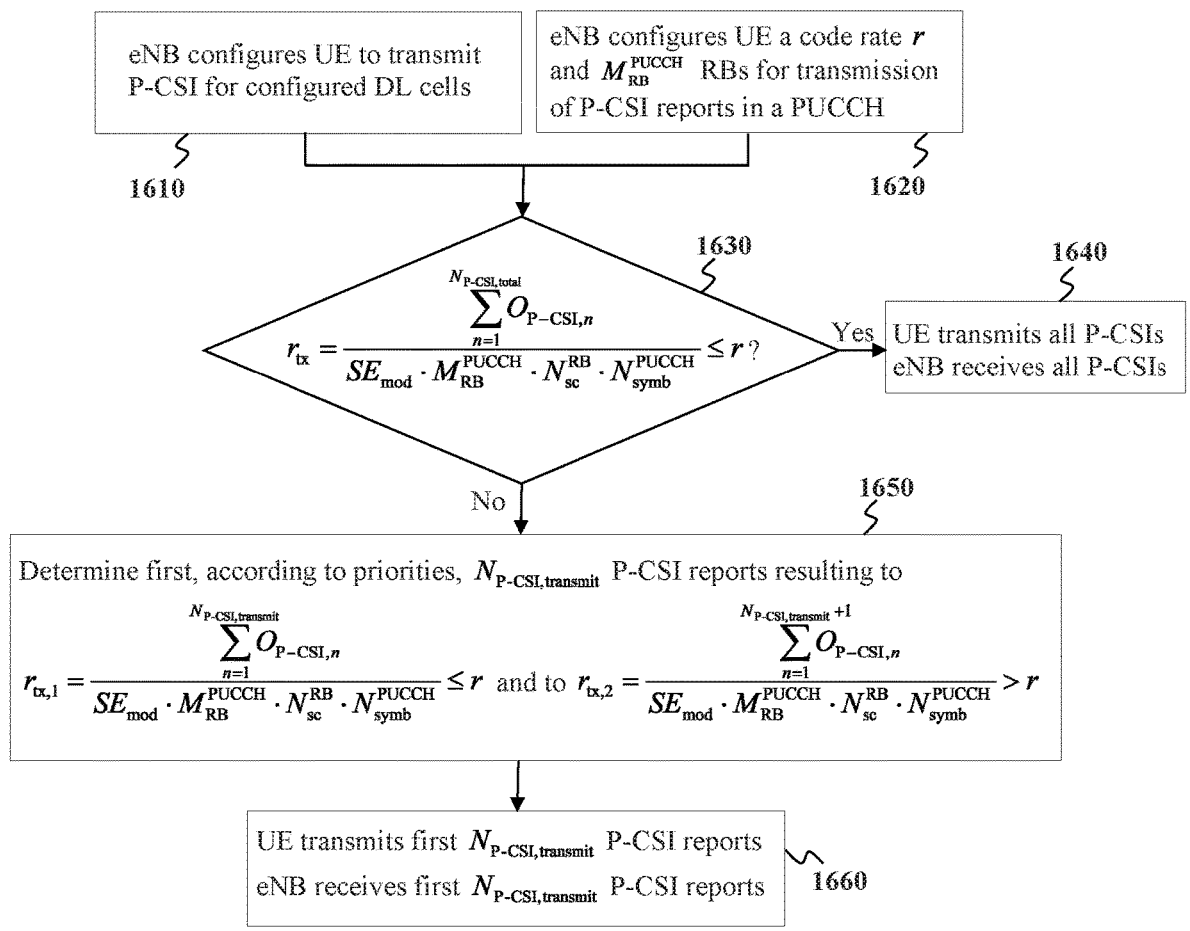
FIG. 16 illustrates a determination by a UE of P-CSI reports to transmit in a PUCCH and a determination by an eNB of P-CSI reports to receive in a SF.

FIG. 16 illustrates a determination by a UE of P-CSI reports to transmit in a PUCCH and a determination by an eNB of P-CSI reports to receive in a SF. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a mobile station.

The eNB 102 configures UE 114 a SF and a periodicity for UE 114 to transmit a P-CSI report for each configured cell 1610. P-CSI reports for a first set of one or more cells have a first periodicity and P-CSI reports for a second set of one or more cells have a second periodicity. The eNB 102 also configures UE 114 a code rate r and resources of $M_{RB}^{PUCCH}$ RBs for UE 114 to transmit P-CSI reports for multiple cells in a PUCCH 1620. When transmission of P-CSI reports for cells in the first set and transmission of P-CSI reports for cells in the second set coincide in a same SF, UE 114 and eNB 102 determine whether a transmission of all $N_{P-CSI,total}$ P-CSI reports for both cells in the first set and cells in the second set in the $M_{RB}^{PUCCH}$ RBs over the SF is with a code rate $r_{tx}$ that is smaller than or equal to the configured code rate r, or equivalently whether $$r_{tx} = \frac{\sum_{n=1}^{N_{P-CSI,total}} O_{P-CSI,n}}{SE_{mod} \cdot M_{RB}^{PUCCH} \cdot N_{sc}^{RB} \cdot N_{symb}^{PUCCH}} \le r \quad 1630$$

when $$r_{tx} = \frac{\sum_{n=1}^{N_{P-CSI,total}} O_{P-CSI,n}}{SE_{mod} \cdot M_{RB}^{PUCCH} \cdot N_{sc}^{RB} \cdot N_{symb}^{PUCCH}} \le r,$$

UE 114 transmits and eNB 102 receives the P-CSI reports for both cells in the first set and cells in the second set 1640. When $$r_{tx} = \frac{\sum_{n=1}^{N_{P-CSI,total}} O_{P-CSI,n}}{SE_{mod} \cdot M_{RB}^{PUCCH} \cdot N_{sc}^{RB} \cdot N_{symb}^{PUCCH}} > r,$$

UE 114 and eNB 102 determine the first $N_{P-CSI,transmit}$ P-CSI reports, according to a predetermined priority indexing of P-CSI reports, resulting in $$r_{tx,1} = \frac{\sum_{n=1}^{N_{P-CSI,transmit}} O_{P-CSI,n}}{SE_{mod} M_{RB}^{PUCCH} \cdot N_{sc}^{RB} \cdot N_{symb}^{PUCCH}} \le r$$

and in $$r_{tx,2} = \frac{\sum_{n=1}^{N_{P-CSI,transmit}} O_{P-CSI,n}}{SE_{mod} M_{RB}^{PUCCH} \cdot N_{sc}^{RB} \cdot N_{symb}^{PUCCH}} > r \quad 1650.$$

UE 114 and eNB 102 transmit and receive, respectively, the first $N_{P-CSI,transmit}$ P-CSI reports in the set of $M_{RB}^{PUCCH}$ RBs over the SF using the PUCCH format 1660. A number of $O_{CRC}$ CRC bits can also be included as part of the P-CSI payload and then the above conditions become $$r_{tx} = \frac{O_{CRC} + \sum_{n=1}^{N_{P-CSI,total}} O_{P-CSI,n}}{SE_{mod} \cdot M_{RB}^{PUCCH} \cdot N_{sc}^{RB} \cdot N_{symb}^{PUCCH}} \le r,$$

$$r_{tx,1} = \frac{O_{CRC} + \sum_{n=1}^{N_{P-CSI,transmit}} O_{P-CSI,n}}{SE_{mod} \cdot M_{RB}^{PUCCH} \cdot N_{sc}^{RB} \cdot N_{symb}^{PUCCH}} \le r, \text{ and}$$

$$r_{tx,2} = \frac{O_{CRC} + \sum_{n=1}^{N_{P-CSI,transmit}} O_{P-CSI,n}}{SE_{mod} \cdot M_{RB}^{PUCCH} \cdot N_{sc}^{RB} \cdot N_{symb}^{PUCCH}} > r.$$

When UE 114 is configured with 2 sets of RBs for transmission of P-CSI reports for respective cells using a PUCCH Format 4, UE 114 can select the set of RBs for transmission of the P-CSI reports from the first set of $M_{RB,1}^{PUCCH}$ RBs or the second set of $M_{RB,2}^{PUCCH}$ RBs where $M_{RB,1}^{PUCCH} < M_{RB,2}^{PUCCH}$. When $$r_{tx} = \frac{\sum_{n=1}^{N_{P-CSI,total}} O_{P-CSI,n}}{SE_{mod} \cdot M_{RB,1}^{PUCCH} \cdot N_{sc}^{RB} \cdot N_{symb}^{PUCCH}} \leq r,$$

UE 114 transmits the P-CSI reports in the first set of RBs; otherwise, UE 114 transmits the P-CSI reports in the second set of $M_{RB,2}^{PUCCH}$ RBs. CRC bits can also be included as part of the P-CSI payload and, for $O_{CRC}$ CRC bits, $$\sum_{n=1}^{N_{P-CSI,total}} O_{P-CSI,n} = \sum_{n=1}^{N_{P-CSI,total}} O_{P-CSI,n} + O_{CRC}.$$

For example, when the first set of RBs includes 1 RB and the second set of RBs includes 2 RBs and the resulting code rate for transmission of all P-CSI reports over 1 RB is larger than the configured code rate, UE 114 selects the second set of RBs (that includes 2 RBs) for transmission of P-CSI reports. For example, when the resulting code rate for transmission of all P-CSI reports over 1 RB is not larger than the configured code rate, UE 114 selects the first set of RBs (that includes 1 RB) for transmission of P-CSI reports.

Figure 17:
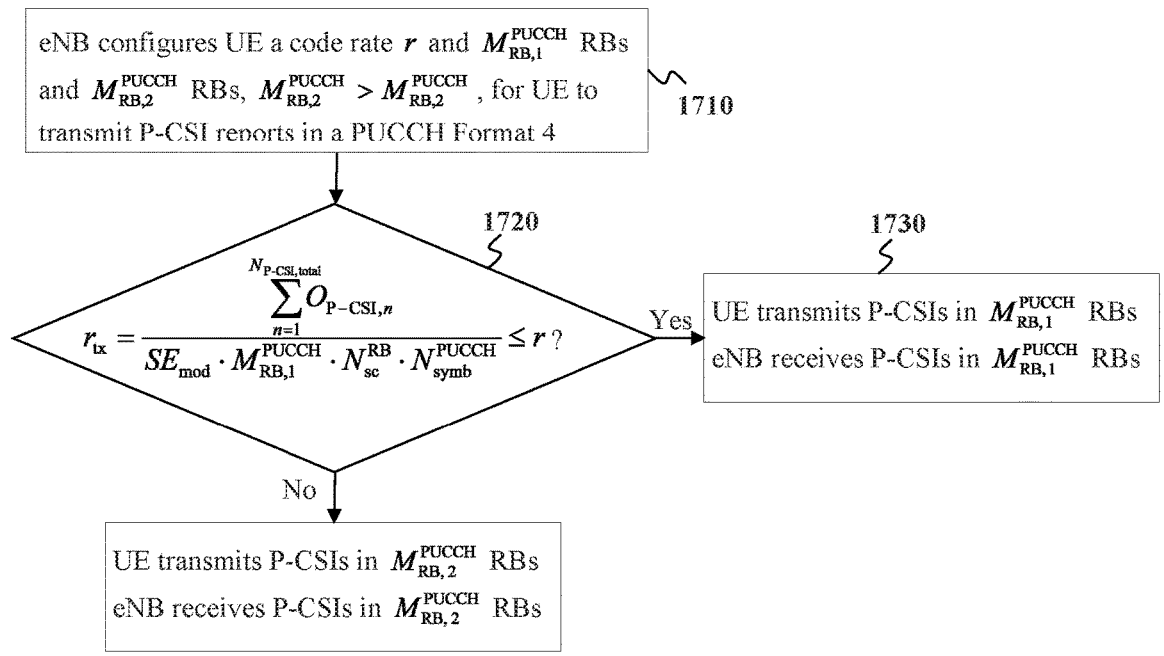
FIG. 17 illustrates a determination by a UE of one set of RBs from two sets of RBs for transmitting P-CSI reports in a PUCCH Format 4 over a SF and a determination by an eNB of one set of RBs from two sets of RBs for receiving P-CSI reports in a PUCCH Format 4 over a SF according to this disclosure.

FIG. 17 illustrates a determination by a UE of one set of RBs from two sets of RBs for transmitting P-CSI reports in a PUCCH Format 4 over a SF and a determination by an eNB of one set of RBs from two sets of RBs for receiving P-CSI reports in a PUCCH Format 4 over a SF according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a mobile station.

The eNB 102 configures UE 114 a code rate r, a first set of $M_{RB,1}^{PUCCH}$ RBs and a second set of $M_{RB,2}^{PUCCH}$ RBs, where $M_{RB,2}^{PUCCH} > M_{RB,1}^{PUCCH}$, for UE 114 to transmit $N_{P-CSI,total}$ P-CSI reports for multiple cells in a PUCCH Format 4 1710. When transmission of P-CSI reports in $M_{RB,1}^{PUCCH}$ RBs using PUCCH Format 4 over a SF results to a code rate $$r_{tx} = \frac{\sum_{n=1}^{N_{P-CSI,total}} O_{P-CSI,n}}{SE_{mod} \cdot M_{RB,1}^{PUCCH} \cdot N_{sc}^{RB} \cdot N_{symb}^{PUCCH}} \leq r \quad 1720,$$

UE 114 transmits and eNB 102 receives the P-CSI reports in the $M_{RB,1}^{PUCCH}$ RBs 1730; otherwise, UE 114 transmit and eNB 102 receives the P-CSI reports in the $M_{RB,2}^{PUCCH}$ RBs 1740. CRC bits can also be included as part of the P-CSI payload and, for $O_{CRC}$ CRC bits, $$\sum_{n=1}^{N_{P-CSI,total}} O_{P-CSI,n} = \sum_{n=1}^{N_{P-CSI,total}} O_{P-CSI,n} + O_{CRC}.$$

When a total P-CSI payload is such that a corresponding PUCCH transmission power is larger than a power UE 114 has available for the PUCCH transmission to eNB 102 then, as a required transmission power decreases as the P-CSI payload decreases, UE 114 can drop transmission of P-CSI reports so that a corresponding PUCCH transmission power becomes smaller than or equal to a power that UE 114 has available for the PUCCH transmission to eNB 102. As eNB 102 does not know with sufficient accuracy a power availability of UE 114 for the PUCCH transmission, eNB 102 can perform multiple decoding operations corresponding to respective hypotheses for the total P-CSI payload. For example, when UE 114 has available power to transmit P-CSI reports only for Cell #0, Cell #2, Cell #4 and Cell #5 in a PUCCH over a number of RBs in a SF but UE 114 does not have available power to transmit P-CSI reports for Cell #0, Cell #2, Cell #4, Cell #5 and Cell #6 (these are the only two options for the transmitted P-CSI reports in the previous example regarding an actual code rate that is not larger than the configured code rate), eNB 102 can perform a first decoding operation corresponding to a first hypothesis that UE 114 transmits P-CSI reports for Cell #0, Cell #2, Cell #4 and Cell #5 and perform a second decoding operation corresponding to a second hypothesis that UE 114 transmits P-CSI reports for Cell #0, Cell #2, Cell #4, Cell #5 and Cell #6. The eNB 102 can select the hypothesis resulting to a positive CRC check. If neither hypothesis results to a positive CRC check, eNB 102 can disregard the contents of a received PUCCH. If both hypotheses result to a positive CRC check (a rare event), eNB 102 can again either disregard the contents of a received PUCCH or select the contents corresponding to one of the two hypotheses. Additional hypotheses can also be considered by eNB 102 such as for example a hypothesis corresponding to transmission by UE 114 of P-CSI reports only for Cell #0, Cell #2, and Cell #4.

To reduce or predefine a number of hypotheses that eNB 102 needs to perform, UE 114 can drop P-CSI reports with a predetermined granularity in a number of non-transmitted P-CSI reports. For example, when UE 114 is configured to transmit $M_{P-CSI}$ P-CSI reports (including potential CRC bits) using a PUCCH Format 4 over a number of $M_{RB}^{PUCCH}$ RBs and UE 114 experiences power limitation for transmitting the $M_{P-CSI}$ P-CSI reports, UE 114 can first consider dropping transmission of last (according to predetermined priorities) $\lceil M_{P-CSI}/4 \rceil$ P-CSI reports. When a power required for transmitting the remaining $M_{P-CSI} - \lceil M_{P-CSI}/4 \rceil$ P-CSI reports is equal to or smaller than an available power that UE 114 has for transmitting P-CSI reports, UE 114 transmits the $M_{P-CSI} - \lceil M_{P-CSI}/4 \rceil$ P-CSI reports (in same PUCCH resources of $M_{RB}^{PUCCH}$ RBs configured for transmission of $M_{P-CSI}$ P-CSI reports). When a power required for transmitting the remaining $M_{P-CSI} - \lceil M_{P-CSI}/4 \rceil$ P-CSI reports is larger than an available power that UE 114 has for transmitting P-CSI reports, UE 114 can consider dropping (not transmitting) last (according to predetermined priorities) $\lceil M_{P-CSI}/2 \rceil$ P-CSI reports. When a power required for transmitting the remaining $M_{P-CSI} - \lceil M_{P-CSI}/2 \rceil$ P-CSI reports is equal to or smaller than an available power that UE 114 has for transmitting P-CSI reports, UE 114 transmits the remaining $M_{P-CSI} - \lceil M_{P-CSI}/2 \rceil$ P-CSI reports (in same PUCCH resources of $M_{RB}^{PUCCH}$ RBs configured for transmission of $M_{P-CSI}$ P-CSI reports). When a power required for transmitting the remaining $M_{P-CSI}-\lceil M_{P-CSI}/2 \rceil$ P-CSI reports is larger than an available power that UE 114 has for transmitting P-CSI reports, UE 114 considers dropping (not transmitting) last (according to predetermined priorities) $\lceil 3 \cdot M_{P-CSI}/4 \rceil$ P-CSI reports. When a power required for transmitting the remaining $M_{P-CSI}-\lceil 3 \cdot M_{P-CSI}/4 \rceil$ P-CSI reports is equal to or smaller than an available power that UE 114 has for transmitting P-CSI reports, UE 114 transmits the remaining $M_{P-CSI}-\lceil 3 \cdot M_{P-CSI}/4 \rceil$ P-CSI reports (in same PUCCH resources of $M_{RB}^{PUCCH}$ RBs configured for transmission of $M_{P-CSI}$ P-CSI reports). Finally, when a power required for transmitting the remaining $M_{P-CSI}-\lceil 3 \cdot M_{P-CSI}/4 \rceil$ P-CSI reports is larger than an available power that UE 114 has for transmitting P-CSI reports, UE 114 can consider dropping all P-CSI reports or transmit only the P-CSI report with the highest priority (either in same PUCCH resources of $M_{RB}^{PUCCH}$ RBs configured for transmission of $M_{P-CSI}$ P-CSI reports or, using a different PUCCH format such as PUCCH Format 2, in a PUCCH resource configured for single P-CSI transmission).

When UE 114 is configured to transmit P-CSI reports in a SF that is also configured for potential SR transmission, an SR information bit is transmitted with priority to P-CSI reports. UE 114 then considers that a total P-CSI payload is $M_{P-CSI}+1$ information bits and UE 114 includes the one information bit corresponding to SR when determining a payload that UE 114 can transmit in the SF.

Embodiment 5: Multiplexing HARQ-ACK/SR and P-CSI for DL CA

The fifth embodiment considers methods and apparatus for multiplexing HARQ-ACK information and P-CSI information for multiple cells in a PUCCH. As previously mentioned, in SFs where a UE is configured to potentially transmit SR, a SR information bit is always assumed to be jointly coded with P-CSI information bits or with HARQ-ACK information bits, is prioritized over P-CSI information bits, and this is not further explicitly discussed in the following.

Transmission of HARQ-ACK information and transmission of P-CSI information from UE 114 can coincide in a same SF. Then, when UE 114 does not transmit PUSCH, UE 114 needs to multiplex HARQ-ACK and P-CSI in a single PUCCH resource. Typically, this is associated with loss of P-CSI reports, particularly when a capacity of the PUCCH resource that eNB 102 indicates to UE 114 through a HARQ-ACK resource offset field in a DCI format (see also REF 2 and REF 3) cannot accommodate both HARQ-ACK and P-CSI payloads, as HARQ-ACK typically has higher transmission priority than P-CSI.

An alternative for UE 114 to avoid dropping of P-CSI reports due to limitations in a PUCCH resource when HARQ-ACK is multiplexed with P-CSI is for UE 114 to use both a first number of one or more consecutive RBs configured for HARQ-ACK transmission and a second number of one or more consecutive RBs configured for P-CSI transmission when UE 114 needs to transmit both HARQ-ACK and P-CSI in a same SF. UE 114 can use a same PUCCH Format, such as a PUCCH Format 4 having a structure as in FIG. 4, to transmit HARQ-ACK information bits and P-CSI information bits in both the first number of RBs and the second number of RBs. When the first number of RBs is contiguous (adjacent in BW) with the second number of RBs, a PUCCH transmission is maintained over a single cluster of RBs (single-carrier type transmission). When the first number of RBs is not contiguous with the second number of RBs, a PUCCH transmission is over two clusters of RBs.

When HARQ-ACK and P-CSI are multiplexed over both the first number of RBs and the second number of RBs, joint encoding or separate encoding can apply. Therefore, in case of joint coding, HARQ-ACK information can be transmitted in the second number of RBs (configured for P-CSI transmission) and encoded P-CSI can be transmitted in the first number of RBs (configured for HARQ-ACK transmission).

Figure 18:
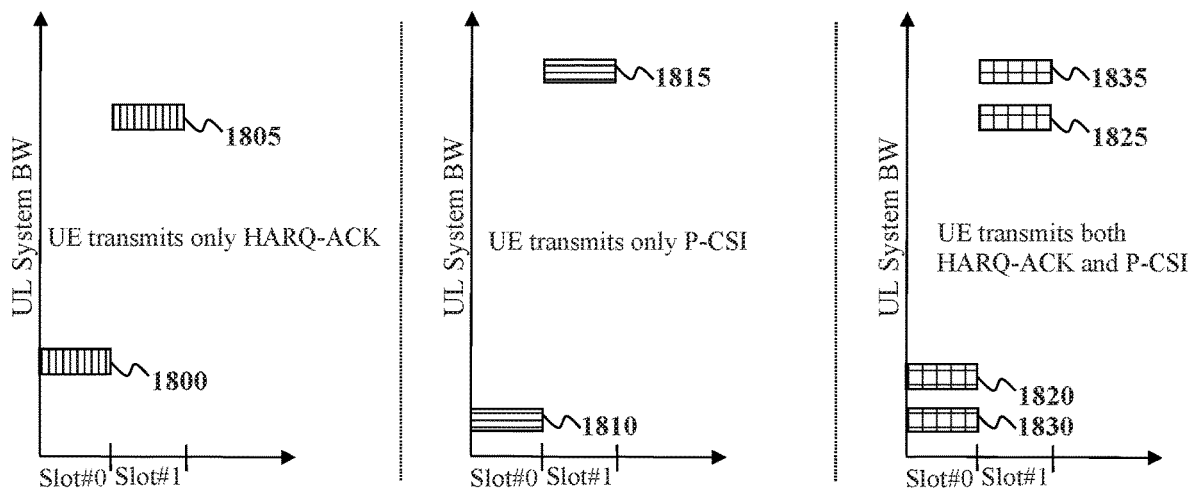
FIG. 18 illustrates a transmission by a UE of HARQ-ACK and P-CSI according to this disclosure.

FIG. 18 illustrates a transmission by a UE of HARQ-ACK and P-CSI according to this disclosure. The embodiment of the transmission shown in FIG. 18 is for illustration only. Other embodiments could be used without departing from the scope of the present disclosure.

The eNB 102 indicates to UE 114 a first number of RBs for HARQ-ACK transmission in a SF. The indication can be by higher layer signaling, such as RRC signaling, or by physical layer signaling such as a HARQ-ACK resource indication field in a DCI format scheduling a PDSCH transmission (DL DCI format—see also REF 2 and REF 3). UE 114 is indicated by eNB 102 a second number of RBs for P-CSI transmission in a SF. The indication can be by higher layer signaling, such as RRC signaling. When UE 114 transmits only HARQ-ACK in a SF, UE 114 uses the first number of RBs for a respective PUCCH transmission 700, 1805. When UE 114 transmits only P-CSI in a SF, UE 114 uses the second number of RBs for a respective PUCCH transmission 1810, 1815. When UE 114 transmits both HARQ-ACK and P-CSI in a SF, UE 114 can jointly or separately encode HARQ-ACK and P-CSI and use both the first number of RBs 1820, 1825 and the second number of RBs 1830, 1835, for a respective PUCCH transmission. The first number of RBs can be contiguous (not shown in FIG. 18) or non-contiguous (shown in FIG. 18) with the second number of RBs in each slot.

Another alternative when UE 114 transmits both HARQ-ACK and P-CSI in a PUCCH over a SF is for UE 114 to implicitly or explicitly include additional RBs contiguous to the RB(s) for HARQ-ACK transmission and towards the interior of the UL system BW in order to obtain additional resources for multiplexing P-CSI. This alternative can ensure that the RB(s) used for HARQ-ACK and P-CSI transmission are contiguous in case not all UEs can support PUCCH transmission in non-contiguous RBs over a SF. With implicit addition of RBs, UE 114 autonomously includes a number of RB(s), for example equal to the number of RB(s) configured for P-CSI transmission, adjacent to the HARQ-ACK RBs and towards the interior of the UL system BW in order to avoid collisions with potential PUCCH transmissions from other UEs in RBs towards the exterior of the UL system BW. With explicit indication, eNB 102 provides separate configurations to UE 114 for a first set of RB(s) for transmission of only HARQ-ACK in a PUCCH and for a second set of RB(s) for transmission of both HARQ-ACK and P-CSI in a PUCCH transmission over a SF. Then, a HARQ-ACK Resource Indication field in a DL DCI format (see also REF 2 and REF 3) indicates RB(s) from a set of RB(s) for PUCCH transmission. UE 114 determines the set of RB(s) that the field refers to based on whether or not UE 114 is configured to transmit only HARQ-ACK or to transmit both HARQ-ACK and P-CSI in a PUCCH over a SF.

When UE 114 transmits both HARQ-ACK and P-CSI in a PUCCH over a SF, UE 114 needs to increase a respective PUCCH transmission power, compared to when UE 114 transmits only HARQ-ACK or only P-CSI. This enables maintaining a same BLER when UE 114 transmits joint HARQ-ACK and P-CSI as when UE 114 transmits only HARQ-ACK or only P-CSI. When the UE is not power limited, the UE can increase a transmission power of a PUCCH conveying both HARQ-ACK and P-CSI according to a number of RBs for HARQ-ACK and P-CSI transmission and according to a total payload of $O_{HARQ-ACK}+O_{P-CSI}$ information bits (and also include a number of $O_{CRC}$ CRC bits such as 8 CRC bits). When HARQ-ACK and P-CSI have a same BLER requirement, HARQ-ACK bits and P-CSI bits are equivalent in terms of required transmission power, a same power control formula can be used by UE 114 to determine a transmission power in a respective PUCCH. UE 114 can increase a PUCCH transmission power according to an increase in a number of RBs or according to $O_{HARQ-ACK}+O_{P-CSI}+O_{CRC}$.

When HARQ-ACK and P-CSI have different BLER requirements and are jointly encoded, UE 114 can determine a PUCCH transmission power according to a power control formula for the UCI type having the lower BLER requirements (this is typically the HARQ-ACK) by assuming a total payload of $O_{HARQ-ACK}+O_{P-CSI}$ information bits and $O_{CRC}$ CRC bits. When HARQ-ACK and CSI are separately encoded and multiplexed in a same PUCCH transmission, eNB 102 and UE 114 can determine a number of REs used for HARQ-ACK and a number of REs used for P-CSI in a total number of REs used for both HARQ-ACK and P-CSI transmissions in the PUCCH based on an effective code rate for HARQ-ACK transmission after rate matching to the total number of REs.

The eNB 102 can configure UE 114 with a code rate for UE 114 to use as a threshold when UE 114 multiplexes both HARQ-ACK and P-CSI in a PUCCH. When a code rate for multiplexing HARQ-ACK and P-CSI reports is not smaller than or equal to the configured code rate, UE 114 can progressively drop transmission of P-CSI reports for cells according to their relative priorities starting from a P-CSI report with the lowest ranking as it was described in the fourth embodiment.

Alternatively, assuming separate coding and a same modulation, such as QPSK, for HARQ-ACK and P-CSI transmission in a PUCCH, eNB 102 can configure UE 114 with a code rate offset for P-CSI relative to HARQ-ACK. For example, eNB 102 can configure a code rate offset, $r_{offset}^{CSI}$, and UE 114 can determine a number of REs for HARQ-ACK transmission and a number of REs for P-CSI transmission so that a resulting code rate for P-CSI is $r_{offset}^{CSI}$ times a resulting code rate for HARQ-ACK and a sum of the number of HARQ-ACK REs and the number of P-CSI REs is equal to a total number of REs available for HARQ-ACK and P-CSI multiplexing in the PUCCH. Therefore, for a HARQ-ACK payload of $O_{HARQ-ACK}$ information bits and a P-CSI payload of $O_{P-CSI}$ information bits, $r_{offset}^{CSI}$ scales a number of REs allocated to P-CSI transmission relative to a number of REs allocated to HARQ-ACK transmission. It is noted that for a same modulation order, a use of different code rates corresponds to different reception reliabilities for the HARQ-ACK and the P-CSI. In this manner, eNB 102 can control the HARQ-ACK BLER and the P-CSI BLER when UE 114 multiplexes HARQ-ACK and P-CSI in a same PUCCH. A configuration of $r_{offset}^{CSI}$ can include a zero value that effectively results to UE 114 transmitting only HARQ-ACK.

Same approaches as for the HARQ-ACK and P-CSI multiplexing in a PUCCH can apply for multiplexing of HARQ-ACK and rank indicators, of rank indicators and P-CSI, or of HARQ-ACK, rank indicators, and P-CSI.

When UE 114 is power limited (with respect to UE 114 being able to transmit a PUCCH with a power determined according to a payload of $O_{HARQ-ACK}+O_{P-CSI}$ information bits and $O_{CRC}$ CRC bits, UE 114 can prioritize transmission of HARQ-ACK and progressively drop transmission of P-CSI reports, according to respective priorities, and transmit only HARQ-ACK to an eNB using PUCCH resources for HARQ-ACK transmission. In this manner, a maximum transmission power available for HARQ-ACK and P-CSI transmission in a PUCCH acts as a configured code rate threshold and the same principles apply until the total HARQ-ACK and P-CSI payload requires a transmission power that is smaller than or equal than a respective available transmission power (similar to requiring a code rate that is smaller. However, unlike dropping of P-CSI reports based on a configured code rate, eNB 102 is not always aware whether or not UE 114 is power limited and therefore cannot be aware of whether or not UE 114 drops P-CSI reports. To address this issue, eNB 102 can attempt to detect a transmitted CW according to a first hypothesis that UE 114 transmits both HARQ-ACK and P-CSI and according to a second hypothesis that UE 114 transmits only HARQ-ACK. The eNB 102 perform a first decoding operation for the first hypothesis, a second decoding operation for the second hypothesis, and process only the decoded output having a positive CRC test.

Figure 19:
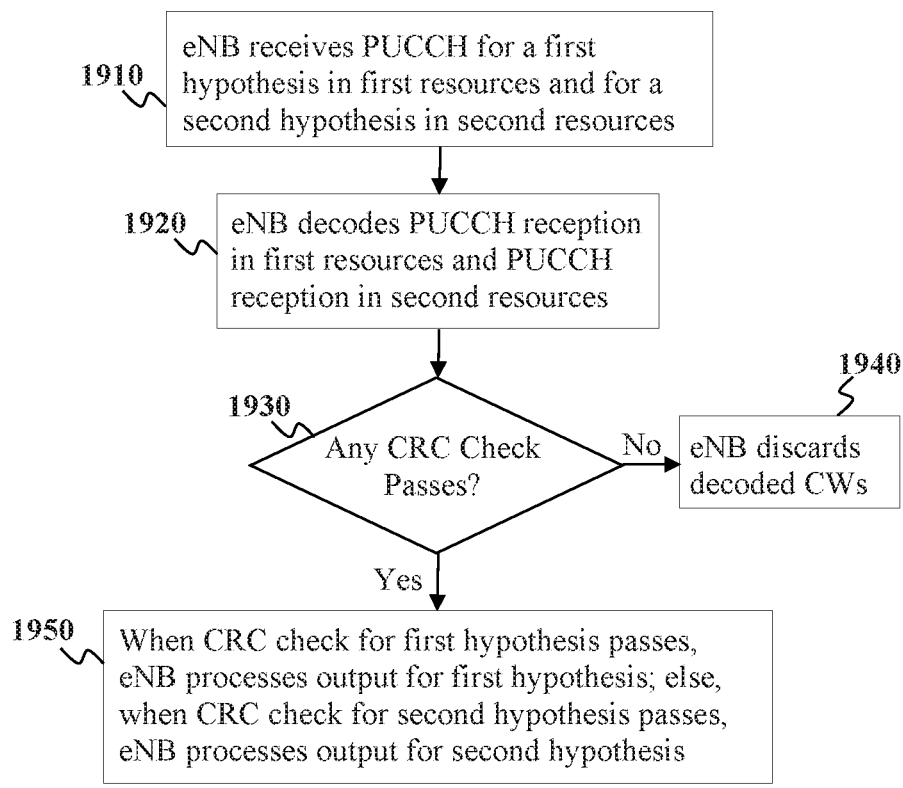
FIG. 19 illustrates a reception by an eNB of HARQ-ACK and P-CSI according to this disclosure.

FIG. 19 illustrates a reception by an eNB of HARQ-ACK and P-CSI according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a receiver chain in, for example, a mobile station.

The eNB 102 receives PUCCH in first resources (RBs) and PUCCH in second resources (RBs) from UE 114 in a SF where UE 114 actually transmits PUCCH either in the first resources or in the second resources 1910. When UE 114 transmits PUCCH in the first resources, the PUCCH conveys both HARQ-ACK and P-CSI (first hypothesis) while when UE 114 transmits PUCCH in the second resources, the PUCCH conveys only HARQ-ACK (second hypothesis). The first resources and the second resources can be same. The eNB 102 decodes a (presumed) CW according to the first hypothesis for the PUCCH reception in the first resources and a (presumed) CW according to the second hypothesis for the PUCCH reception in the second resources 1920. The eNB 102 performs a CRC check for each of the two decoding operations in step 1920 and examines whether any of the two CRC checks passes 1930. When both CRC tests do not pass, eNB 102 discards the received CWs 1940. When the CRC check for the first hypothesis passes, eNB 102 de-multiplexes the decoder output to obtain both HARQ-ACK information bits and P-CSI information bits; else, when the CRC check for the second hypothesis passes, eNB 102 obtains only HARQ-ACK information bits 1950.

In an alternative realization of HARQ-ACK and P-CSI transmission when UE 114 is power limited for transmitting $O_{HARQ-ACK}+O_{P-CSI}$ information bits and $O_{CRC}$ CRC bits, instead of dropping transmission of all $O_{P-CSI}$ bits, UE 114 can consider whether a required power for transmitting some P-CSI reports, in addition to transmitting HARQ-ACK, in a PUCCH over a SF does not exceed a transmission power UE 114 has available to transmit HARQ-ACK and P-CSI in the SF. Then, instead of UE 114 dropping all P-CSI reports in order to transmit HARQ-ACK when UE 114 is power limited, UE 114 drops transmission of P-CSI reports for some cells, according to predetermined P-CSI priorities, with a predetermined granularity until UE 114 is not power limited as it was previously described (when a transmission code rate of P-CSI reports initially exceeds a configured code rate). A same or different code rate configuration can apply or be specified in a system operation for multiplexing both HARQ-ACK and P-CSI reports and for multiplexing only P-CSI reports in a PUCCH.

For example, when UE 114 is configured to transmit 8 P-CSI reports in a PUCCH over a SF, UE 114 can consider whether a power required to transmitting 4 P-CSI reports for respective cells (the ones with the higher priority among the 8 P-CSI reports), in addition to HARQ-ACK, requires a transmission power that is not larger a transmission power UE 114 has available for transmitting HARQ-ACK and P-CSI in the SF. When the transmission power is not larger than the available UE transmission power in the SF, UE 114 transmits the 4 P-CSI reports in addition to HARQ-ACK; otherwise, UE 114 transmits only HARQ-ACK. In addition to considering the two hypotheses corresponding to HARQ-ACK and full P-CSI transmission and to only HARQ-ACK transmission, eNB 102 can consider a third hypothesis corresponding to partial P-CSI transmission and the functionality is similar to the one described in FIG. 19.

An increased granularity for transmission (or for dropping transmission) of P-CSI reports can also apply. For example UE 114 can first consider whether UE 114 can transmit 6 of the 8 P-CSI reports and, when UE 114 is power limited, UE 114 then considers whether UE 114 can transmit 4 of the 8 P-CSI reports and, when UE 114 is again power limited, UE 114 then considers whether UE 114 can transmit 2 of the 8 P-CSI reports, and when UE is again power limited, UE 114 transmits only HARQ-ACK. This minimizes a number of non-transmitted P-CSI reports but eNB 102 needs to examine a larger number of hypotheses. When UE 114 transmits at least some of the P-CSI reports, in addition to HARQ-ACK, UE 114 can transmit the respective P-CSI and HARQ-ACK in resources corresponding to both P-CSI transmission and HARQ-ACK transmission.

Figure 20:
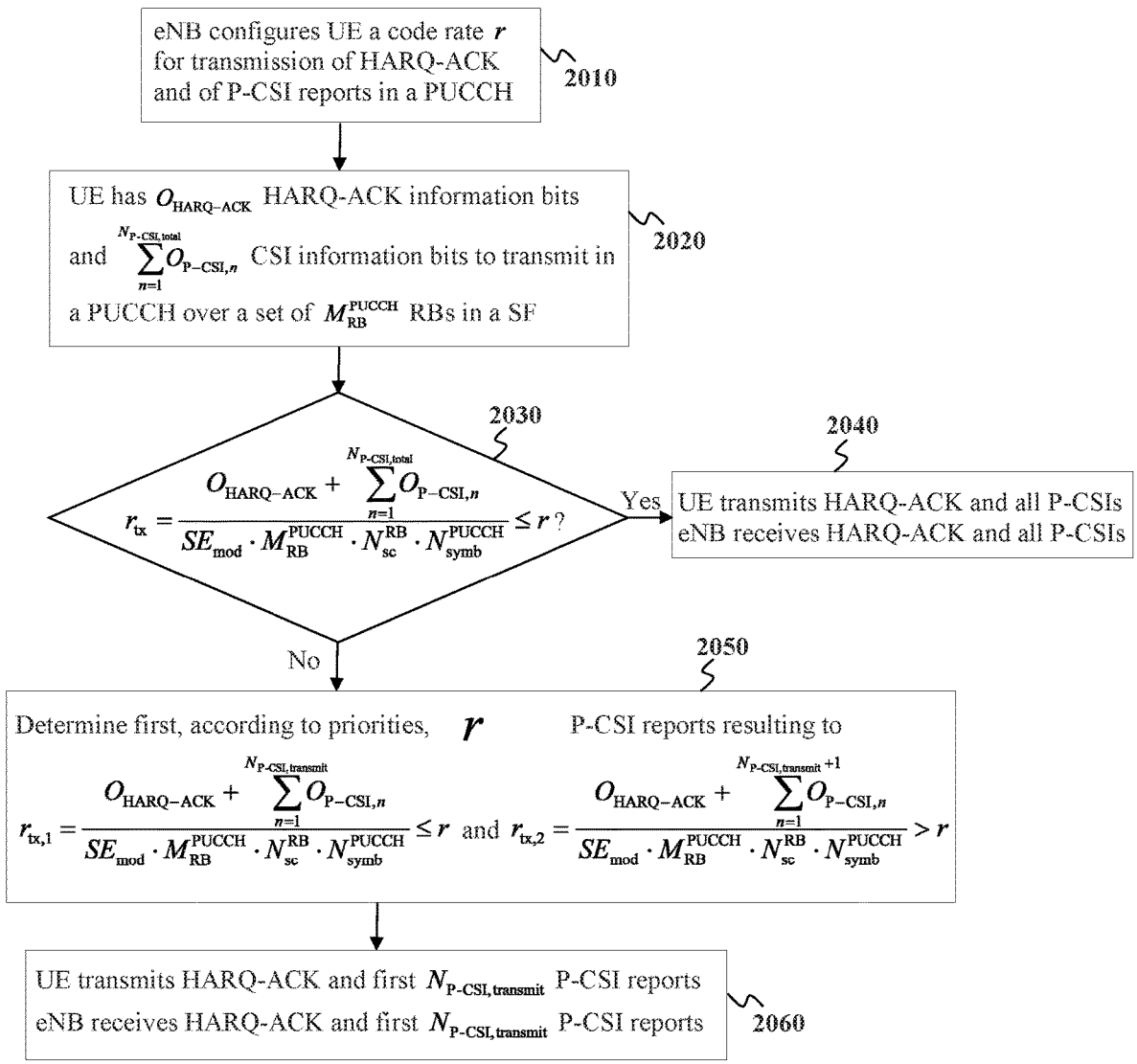
FIG. 20 illustrates a determination by a UE of P-CSI reports to transmit in a PUCCH and a determination by an eNB of P-CSI reports to receive in a SF according to a configured code rate when the P-CSI reports are multiplexed with HARQ-ACK information.

FIG. 20 illustrates a determination by a UE of P-CSI reports to transmit in a PUCCH and a determination by an eNB of P-CSI reports to receive in a SF according to a configured code rate when the P-CSI reports are multiplexed with HARQ-ACK information. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

The eNB 102 configures UE 114 a code rate r for UE 114 to transmit HARQ-ACK information and P-CSI reports in a PUCCH 2010. The code rate configuration is either same or different as the code rate configuration for multiplexing only P-CSI reports in a PUCCH. UE 114 has $O_{HARQ-ACK}$ HARQ-ACK information bits and $$\sum_{n=1}^{N_{P-CSI,total}} O_{P-CSI,n}$$

CSI information bits (and $O_{CRC}$ CRC bits) to transmit in a PUCCH over a set of $M_{RB}^{PUCCH}$ RBs in a SF 2020. UE 114 and eNB 102 determine whether a transmission of HARQ-ACK information and of all $N_{P-CSI,total}$ P-CSI reports is with a code rate that is smaller than or equal to the configured code rate, or equivalently whether $$r_{tx} = \frac{O_{HARQ-ACK} + \sum_{n=1}^{N_{P-CSI,total}} O_{P-CSI,n}}{SE_{mod} \cdot M_{RB}^{PUCCH} \cdot N_{sc}^{RB} \cdot N_{symb}^{PUCCH}} \leq r \ 2030.$$

When $$r_{tx} = \frac{O_{HARQ-ACK} + \sum_{n=1}^{N_{P-CSI,total}} O_{P-CSI,n}}{SE_{mod} \cdot M_{RB}^{PUCCH} \cdot N_{sc}^{RB} \cdot N_{symb}^{PUCCH}} \leq r,$$

UE 114 transmits and eNB 102 receives the HARQ-ACK information and all P-CSI reports 2040. When $$r_{tx} = \frac{O_{HARQ-ACK} + \sum_{n=1}^{N_{P-CSI,total}} O_{P-CSI,n}}{SE_{mod} \cdot M_{RB}^{PUCCH} \cdot N_{sc}^{RN} \cdot N_{symb}^{PUCCH}} > r,$$

UE 114 and eNB 102 determine the first $N_{P-CSI,total}$ P-CSI reports, according to the priority indexing of P-CSI reports, resulting in $$r_{tx,1} = \frac{O_{HARQ-ACK} + \sum_{n=1}^{N_{P-CSI,transmit}} O_{P-CSI,n}}{SE_{mod} \cdot M_{RB}^{PUCCH} \cdot N_{sc}^{RB} \cdot N_{symb}^{PUCCH}} \leq r$$

and in $$r_{tx,2} = \frac{O_{HARQ-ACK} + \sum_{n=1}^{N_{P-CSI,transmit}} O_{P-CSI,n}}{SE_{mod} \cdot M_{RB}^{PUCCH} N_{sc}^{RB} N_{symb}^{PUCCH}} > r \ 2060.$$

UE 114 and eNB 102 transmit and receive, respectively, the first $N_{P-CSI,transmit}$ P-CSI reports in the set of $M_{RB}^{PUCCH}$ RBs over the SF using the PUCCH format 2070.

When the SF of HARQ-ACK and P-CSI multiplexing is a SF that eNB 102 configures UE 114 to transmit SR, the term $O_{HARQ-ACK}$ is replaced by the term $O_{HARQ-ACK}+O_{SR}$, where $O_{SR}=1$ in a SF that UE 114 is configured for SR transmission and $O_{SR}=0$ in a SF that UE 114 is not configured for SR transmission. A number of $O_{CRC}$ CRC bits can also be included as part of the HARQ-ACK and P-CSI payload. Therefore, in general, the conditions in FIG. 20 are $$r_{tx,1} = \frac{O_{HARQ-ACK} + O_{SR} + \sum_{n=1}^{N_{P-CSI,transmit}} O_{P-CSI,n} + O_{CRC}}{SE_{mod} \cdot M_{RB}^{PUCCH} \cdot N_{sc}^{RB} \cdot N_{symb}^{PUCCH}} \leq r$$

and $$r_{tx,2} = \frac{O_{HARQ-ACK} + O_{SR} + \sum_{n=1}^{N_{P-CSI,transmit}} O_{P-CSI,n} + O_{CRC}}{SE_{mod} \cdot M_{RB}^{PUCCH} \cdot N_{sc}^{RB} \cdot N_{symb}^{PUCCH}} > r.$$

Figure 21:
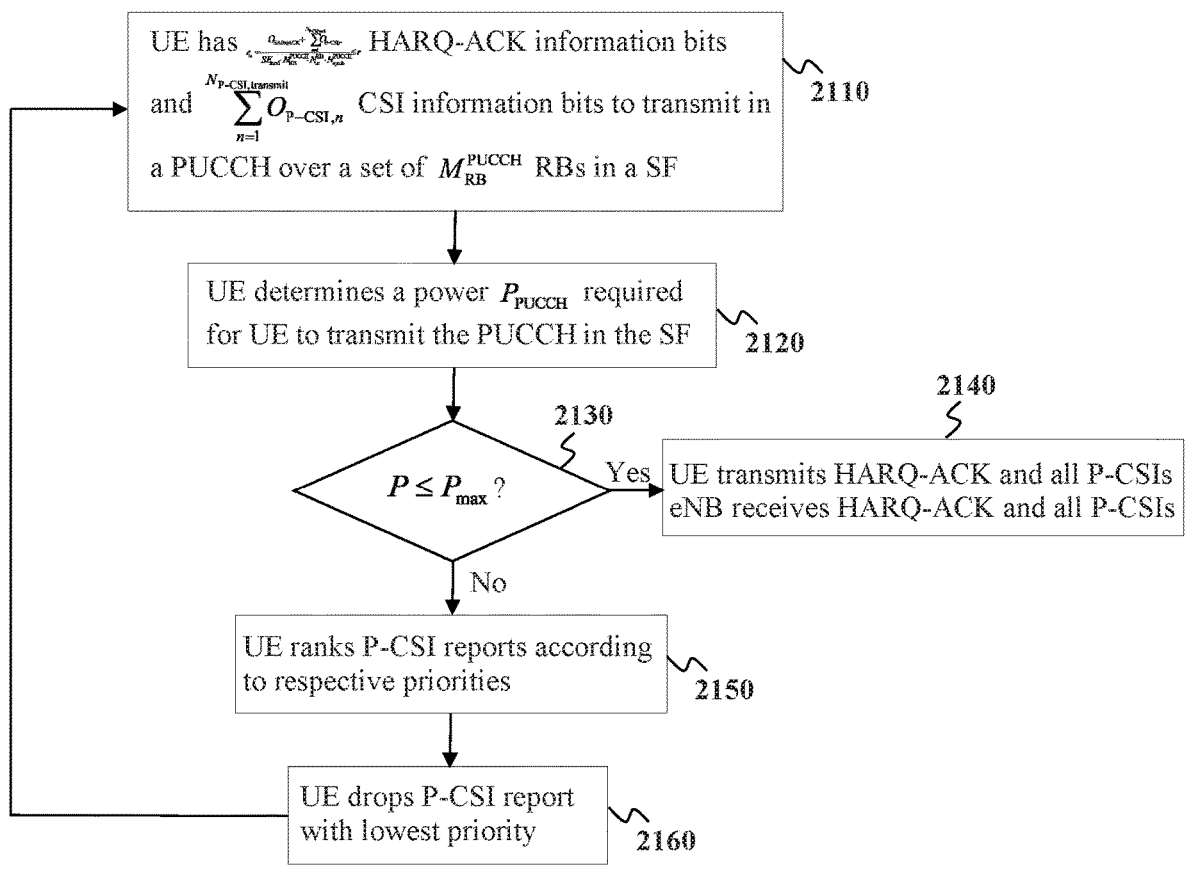
FIG. 21 illustrates a process for a UE to determine a set of P-CSI reports to transmit in a PUCCH based on a required transmission power when the P-CSI reports are multiplexed with HARQ-ACK information according to this disclosure.

FIG. 21 illustrates a process for a UE to determine a set of P-CSI reports to transmit in a PUCCH based on a required transmission power when the P-CSI reports are multiplexed with HARQ-ACK information according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a mobile station.

UE 114 has $O_{HARQ-ACK}$ HARQ-ACK information bits, $$\sum_{n=1}^{N_{P-CSI,total}} O_{P-CSI,n}$$

CSI information bits corresponding to a set of $N_{P-CSI,total}$ P-CSI reports, and $O_{CRC}$ CRC bits to transmit in a PUCCH over a set of $M_{RB}^{PUCCH}$ RBs in a SF 2110. UE 114 determines a power $P_{PUCCH}$ that UE 114 requires to transmit the PUCCH in the SF 2120. UE 114 examines whether or not $P_{PUCCH} \leq P_{max}$, where $P_{max}$ is a maximum transmission power for UE 114 in the SF 2130. When $P_{PUCCH} \leq P_{max}$, UE 114 transmits the HARQ-ACK information bits and all P-CSI reports 2140. When $P_{PUCCH} > P_{max}$, UE 114 ranks the P-CSI reports according to their priorities 2150. UE 114 drops, from the set of P-CSI reports, the P-CSI report with the lowest priority 2160 and UE 114 continues from step 2110.

UE 114 or eNB 102 can apply the procedure in FIG. 21 also for determining a number of P-CSI reports to transmit or receive, respectively, when a transmission code rate for a total number of P-CSI reports for transmission in a SF is larger than a configured code rate. In such case, $P_{PUCCH}$ is replaced by the transmission code rate and $P_{max}$ is replaced by the configured code rate. Therefore, when $$r_{tx} = \frac{O_{HARQ-ACK} + O_{SR} + \sum_{n=1}^{N_{P-CSI,total}} O_{P-CSI,n} + O_{CRC}}{SE_{mod} \cdot M_{RB}^{PUCCH} \cdot N_{sc}^{RB} \cdot N_{symb}^{PUCCH}} > r,$$

UE 114 (a) drops the P-CSI report with the lowest priority from the $N_{P-CSI,total}$ CSI reports to obtain a number of $N_{P-CSI,total}-1$ P-CSI reports, (b) determines whether $$r_{tx} = \frac{O_{HARQ-ACK} + O_{SR} + \sum_{n=1}^{N_{P-CSI,total}-1} O_{P-CSI,n} + O_{CRC}}{SE_{mod} \cdot M_{RB}^{PUCCH} \cdot N_{sc}^{RB} \cdot N_{symb}^{PUCCH}} > r,$$

and (c) either sets $N_{P-CSI,total} = N_{P-CSI,total}-1$ and repeats steps (a), (b), and (c) when $r_{\alpha,1} > r$ or transmits the $N_{P-CSI,total}-1$ P-CSI reports when $r_{\alpha,1} > r$.

Figure 22:
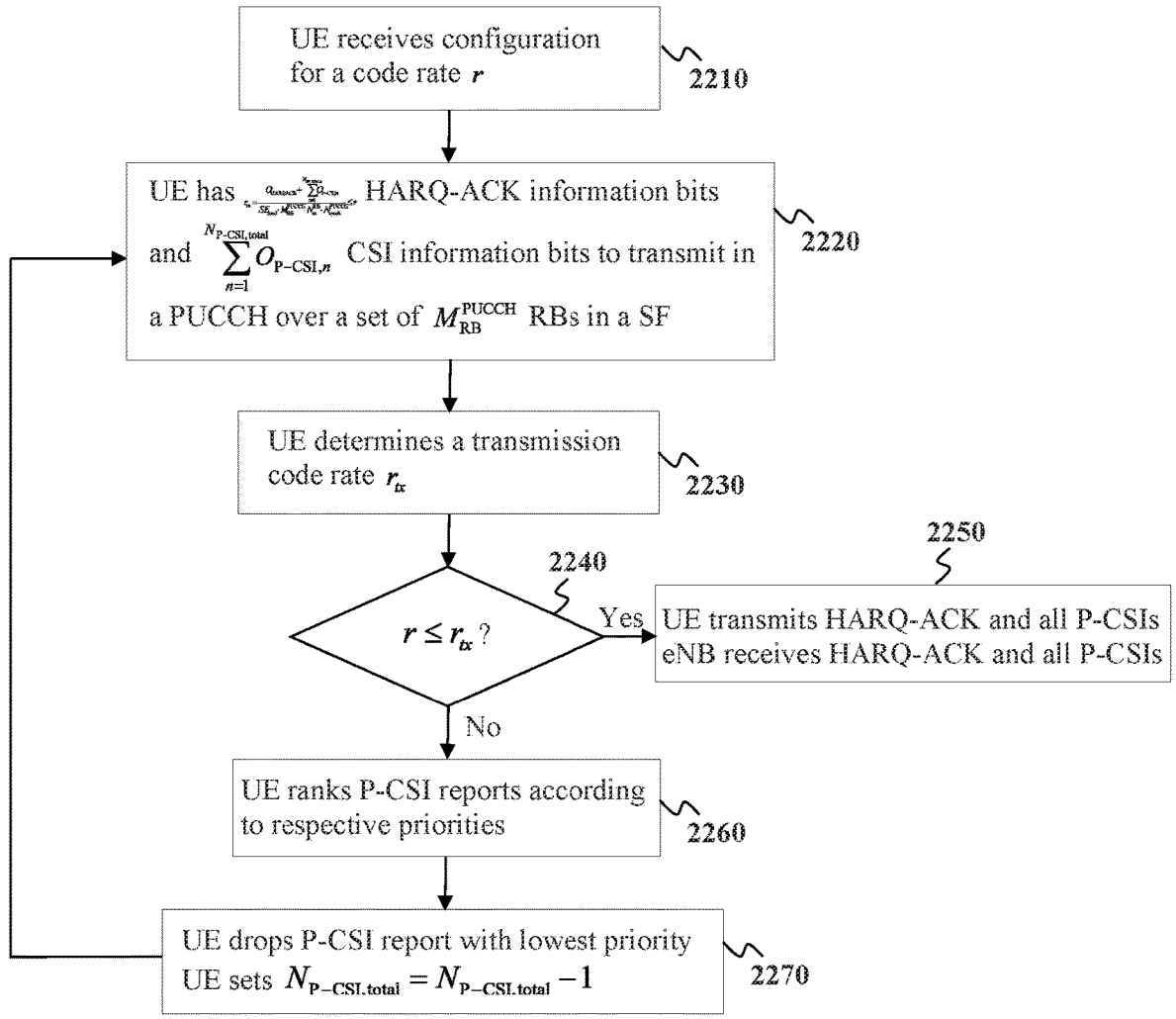
FIG. 22 illustrates a process for a UE to determine a set of P-CSI reports to transmit in a PUCCH based on a transmission code rate when the P-CSI reports are multiplexed with HARQ-ACK information according to this disclosure.

FIG. 22 illustrates a process for a UE to determine a set of P-CSI reports to transmit in a PUCCH based on a transmission code rate when the P-CSI reports are multiplexed with HARQ-ACK information according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a mobile station.

The eNB 102 configures UE 114 a code rate r 2210. UE 114 has $O_{HARQ-ACK}$ HARQ-ACK information bits, $$\sum_{n=1}^{N_{P-CSI,total}} O_{P-CSI,n}$$

CSI information bits, corresponding to a set of $N_{P-CSI,total}$ P-CSI reports, and $O_{CRC}$ CRC bits to transmit in a PUCCH over a set of $M_{RB}^{PUCCH}$ RBs in a SF 2220. UE 114 determines a transmission code rate $r_{tx}$ required for transmitting the $$O_{HARQ-ACK} + \sum_{n=1}^{N_{P-CSI,total}} O_{P-CSI,n} + O_{CRC}$$

bits in the PUCCH 2230. UE 114 examines whether or not $r \leq r_{tx}$ 2240. When $r \leq r_{tx}$, UE 114 transmits the HARQ-ACK information bits and all P-CSI reports 2250. When $r > r_{tx}$, UE 114 ranks the P-CSI reports according to their respective priorities 2260. UE 114 drops, from the set of P-CSI reports, the P-CSI report with the lowest priority, sets $N_{P-CSI,total} = N_{P-CSI,total}-1$ 2270, and UE 114 continues from step 2220. The steps in FIG. 22 performed by UE 114 can also be performed by eNB 102.

In FIG. 21, the granularity for dropping transmission of P-CSI reports before determining whether a required transmission power for a PUCCH over a set of $M_{RB}^{PUCCH}$ RBs in a SF is smaller than or equal than a maximum transmission power in the SF is one P-CSI report but a coarser granularity can also apply. The granularity can be configured to UE 114 by eNB 102 or be specified in a system operation. Based on the granularity for dropping transmission of P-CSI reports, eNB 102 can perform a respective number of decoding operations corresponding to a respective number of possible hypotheses for a number of transmitted P-CSI reports and select as valid a hypothesis that results to a positive CRC check.

One difference between UE 114 dropping P-CSI reports to achieve a transmission code rate smaller than or equal to a configured code rate and UE 114 dropping P-CSI reports to achieve a required transmission power smaller than or equal to a maximum transmission power in a respective subframe is that in the former case the eNB 102 is aware of the P-CSI dropping by UE 114 while in the latter case the eNB 102 is not aware of the P-CSI dropping and needs to rely on hypothesis testing, similar to the one described in FIG. 15 with respect to the ambiguity for activated or deactivated cells, in order to resolve an ambiguity in a number of P-CSI reports dropped (or transmitted) by UE 114. To avoid such hypothesis testing at eNB 102, UE 114 can transmit all P-CSI reports (resulting to a transmission code rate smaller than or equal to a configured code rate) despite a resulting BLER being larger than a target BLER. When HARQ-ACK information is multiplexed (jointly coded) with P-CSI reports, a resulting BLER will also be larger for the HARQ-ACK information and there is no prioritization of HARQ-ACK/SR over P-CSI.

When UE 114 can be configured to apply HARQ-ACK bundling in the spatial domain in response to reception of data TBs in a same PDSCH, for example when UE 114 experiences low SINR or large path-loss. For HARQ-ACK transmission in a PUCCH Format 4. The eNB 102 can also configure UE 114 to apply spatial domain bundling, even when UE 114 is not power limited, in order to reduce a HARQ-ACK information payload.

When UE 114 encodes P-CSI, the encoding method can depend on a number of $O_{P\text{-}CSI}$ information bits or on a number of P-CSI reports. When $O_{P\text{-}CSI}$ is less than a first predetermined number $X_1$ or a number of P-CSI reports $M_{P\text{-}CSI}$ is less than a first predetermined number $R_1$, such as $O_{P\text{-}CSI}<12$ or $M_{P\text{-}CSI}<2$, Reed-Muller (RM) coding is used (see also REF 2). When $X_1 \leq O_{P\text{-}CSI} < X_2$, where $X_2$ is a second predetermined number, or when $M_{P\text{-}CSI} \geq R_1$, TBCC is used including attachment of CRC bits. When $O_{P\text{-}CSI} > X_2$, turbo-coding (TC) can be used. When the UE jointly encodes HARQ-ACK and P-CSI, the encoding method can depend on a number of $O_{HARQ\text{-}ACK}+O_{P\text{-}CSI}$ information bits or on a number of P-CSI reports. In case that the encoding method is based on the number of $O_{HARQ\text{-}ACK}+O_{P\text{-}CSI}$ information bits, a same rule as in case of transmission of only P-CSI reports can apply for a switching among different encoding methods with $O_{P\text{-}CSI}$ replaced by $O_{HARQ\text{-}ACK}+O_{P\text{-}CSI}$. When $O_{HARQ\text{-}ACK}+O_{P\text{-}CSI}$ is smaller than or equal a predetermined number Y, such as when $O_{HARQ\text{-}ACK}+O_{P\text{-}CSI} \leq 22$, Reed-Muller (RM) coding is used (see also REF 2). When $O_{HARQ\text{-}ACK}+O_{P\text{-}CSI}$ is larger than the predetermined number Y, such as $O_{HARQ\text{-}ACK}+O_{P\text{-}CSI}>22$, TBCC with CRC is used (see also REF 5).

As a decoding latency for TC is larger than a decoding latency for TBCC, eNB 102 processing requirements related to HARQ processing increase when a latency for obtaining HARQ-ACK information increases. Therefore, it is preferable to avoid use of TC for HARQ-ACK information bits. However, use of TBCC can be disadvantageous when $O_{HARQ\text{-}ACK}+O_{P\text{-}CSI}>X_2$, particularly when it is also $O_{P\text{-}CSI}>X_2$. Therefore, when UE 114 uses TC to encode P-CSI information bits, UE 114 can separately encode HARQ-ACK and P-CSI information bits and use either RM coding or TBCC for the HARQ-ACK encoding depending on a value for $O_{HARQ\text{-}ACK}$. When HARQ-ACK and P-CSI are separately encoded, UE 114 can transmit (and eNB 102 can receive) HARQ-ACK only in PUCCH resources for HARQ-ACK transmission and P-CSI only in PUCCH resources for P-CSI transmission.

Figure 23:
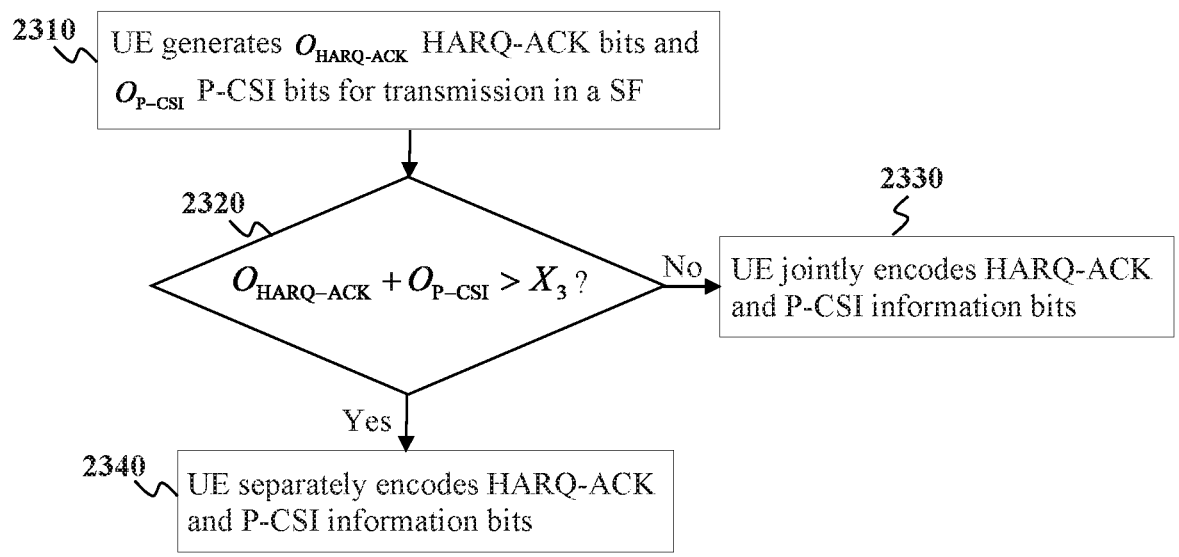
FIG. 23 illustrates a multiplexing of HARQ-ACK information in a PUCCH or in a PUSCH according to this disclosure.

FIG. 23 illustrates a determination of an encoding method for HARQ-ACK and P-CSI in a PUCCH according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a mobile station.

UE 114 generates $O_{HARQ\text{-}ACK}$ HARQ-ACK information bits and $O_{P\text{-}CSI}$ P-CSI information bits for transmission in a PUCCH over a SF 2310. UE 114 examines whether $O_{HARQ\text{-}ACK}+O_{P\text{-}CSI}>X_3$, where $X_3$ is a predetermined number 2320. When $O_{HARQ\text{-}ACK}+O_{P\text{-}CSI} \leq X_3$, UE 114 jointly encodes HARQ-ACK information bits and P-CSI information bits using RM coding or TBCC 2330. When $O_{HARQ\text{-}ACK}+O_{P\text{-}CSI}>X_3$, UE 114 separately encodes HARQ-ACK information bits and P-CSI information bits 2340.

Although the present disclosure has been described with example embodiments, various changes and modifications may be suggested to one skilled in the art. It is intended that the present disclosure encompass such changes and modifications that fall within the scope of the appended claims.

What is claimed is:

1. A method for transmitting a first uplink control information (UCI) and a second UCI in a physical uplink control channel (PUCCH), the method comprising:
   receiving
      a configuration for a first code rate, and
      a configuration for a second code rate;
   determining
      a first number of resource elements (REs) of the PUCCH for transmitting the first UCI based on the first code rate, and
      a second number of the REs of the PUCCH for transmitting the second UCI based on the second code rate; and
   transmitting the PUCCH with
      the first UCI over the first number of the REs of the PUCCH, and
      the second UCI over the second number of the REs of the PUCCH.

2. The method of claim 1, wherein the REs of the PUCCH used for transmitting the first UCI or the second UCI exclude REs of the PUCCH used for transmitting reference signals.

3. The method of claim 1, wherein:
   the first UCI is hybrid automatic repeat request acknowledgement (HARQ-ACK) information, and
   the second UCI is channel state information (CSI).

4. The method of claim 1, further comprising encoding separately the first UCI and the second UCI.

5. The method of claim 1, wherein the configuration of the second code rate is by an offset relative to the first code rate.

6. The method of claim 1, further comprising:
   receiving a configuration for a set of numbers of resource blocks (RBs);
   determining a smallest number of RBs, from the set of numbers of RBs, that have a number of REs for transmitting:
      the first UCI with a code rate that is smaller than or equal to the first code rate, and
      the second UCI with a code rate that is smaller than or equal to the second code rate; and
   transmitting the PUCCH over the smallest number of RBs.

7. The method of claim 1, further comprising:
   receiving
      a first configuration for values of parameters for computing a first power of a PUCCH transmission with only the first UCI, and
      a second configuration for values of parameters for computing a second power of a PUCCH transmission with only the second UCI;

determining a power according to the first configuration for computing a power of a PUCCH transmission; and
transmitting the PUCCH with the power.

8. A user equipment (UE), comprising:
a receiver configured to receive
  a configuration for a first code rate, and
  a configuration for a second code rate;
a processor operably connected to the receiver, the processor configured to determine
  a first number of resource elements (REs) of a physical uplink control channel (PUCCH) for transmitting a first uplink control information (UCI) based on the first code rate, and
  a second number of the REs of the PUCCH for transmitting a second UCI based on the second code rate; and
a transmitter operably connected to the processor, the transmitter configured to transmit the PUCCH with
  the first UCI over the first number of the REs of the PUCCH, and
  the second UCI over the second number of the REs of the PUCCH.

9. The UE of claim 8, wherein the REs of the PUCCH used for transmitting the first UCI or the second UCI exclude REs of the PUCCH used for transmitting reference signals.

10. The UE of claim 8, wherein:
the first UCI is hybrid automatic repeat request acknowledgement (HARQ-ACK) information, and
the second UCI is channel state information (CSI).

11. The UE of claim 8, further comprising an encoder configured to encode separately the first UCI and the second UCI.

12. The UE of claim 8, wherein the configuration of the second code rate is by an offset relative to the first code rate.

13. The UE of claim 8, wherein:
the receiver is further configured to receive a configuration for a set of numbers of resource blocks (RBs);
the processor is further configured to determine a smallest number of RBs, from the set of numbers of RBs, that have a number of REs for transmitting:
  the first UCI with a code rate that is smaller than or equal to the first code rate, and
  the second UCI with a code rate that is smaller than or equal to the second code rate; and
the transmitter is further configured to transmit the PUCCH over the smallest number of RBs.

14. The UE of claim 8, wherein: the receiver is further configured to receive
a first configuration for values of parameters for computing a first power of a PUCCH transmission with only the first UCI, and
a second configuration for values of parameters for computing a second power of a PUCCH transmission with only the second UCI;
the processor is further configured to determine a power according to the first configuration for computing a power of a PUCCH transmission; and
the transmitter is further configured to transmit the PUCCH with the power.

15. A base station, comprising:
a transmitter configured to transmit
  a configuration for a first code rate, and
  a configuration for a second code rate;
a processor operably connected to the transmitter, the processor configured to determine
  a first number of resource elements (REs) of a physical uplink control channel (PUCCH) for receiving a first uplink control information (UCI) based on the first code rate, and
  a second number of the REs of the PUCCH for receiving a second UCI based on the second code rate; and
a receiver operably connected to the processor, the receiver configured to receive the PUCCH with
  the first UCI over the first number of the REs of the PUCCH, and
  the second UCI over the second number of the REs of the PUCCH.

16. The base station of claim 15, wherein the REs of the PUCCH used for receiving the first UCI or the second UCI exclude REs of the PUCCH used for receiving reference signals.

17. The base station of claim 15, wherein:
the first UCI is hybrid automatic repeat request acknowledgement (HARQ-ACK) information, and
the second UCI is channel state information (CSI).

18. The base station of claim 15, further comprising a decoder configured to decode separately the first UCI and the second UCI.

19. The base station of claim 15, wherein the configuration of the second code rate is by an offset relative to the first code rate.

20. The base station of claim 15, wherein:
the transmitter is further configured to transmit a configuration for a set of numbers of resource blocks (RBs);
the processor is further configured to determine a smallest number of RBs, from the set of number of RBs, that have a number of REs for receiving:
  the first UCI with a code rate that is smaller than or equal to the first code rate, and
  the second UCI with a code rate that is smaller than or equal to the second code rate; and
the receiver is further configured to receive the PUCCH over the smallest number of RBs.

* * * * *